(12) United States Patent
Yanagisawa et al.

(10) Patent No.: US 7,744,094 B2
(45) Date of Patent: Jun. 29, 2010

(54) MECHANICAL SEAL DEVICE

(75) Inventors: Takashi Yanagisawa, Tokyo (JP); Koji Akiyama, Tokyo (JP); Masanobu Ito, Tokyo (JP); Mami Uchiyama, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 474 days.

(21) Appl. No.: 11/667,166

(22) PCT Filed: Oct. 28, 2005

(86) PCT No.: PCT/JP2005/019923

§ 371 (c)(1),
(2), (4) Date: May 7, 2007

(87) PCT Pub. No.: WO2006/051702

PCT Pub. Date: May 18, 2006

(65) Prior Publication Data

US 2007/0296156 A1     Dec. 27, 2007

(30) Foreign Application Priority Data

Nov. 9, 2004   (JP) ............................ 2004-325471

(51) Int. Cl.
   *F16J 15/40*   (2006.01)
(52) U.S. Cl. .................. 277/399; 277/408; 277/400
(58) Field of Classification Search .............. 277/400, 277/401, 408, 431, 399
   See application file for complete search history.

(56) References Cited

U.S. PATENT DOCUMENTS

| | | | | |
|---|---|---|---|---|
| 3,527,465 A | * | 9/1970 | Guinard | 277/400 |
| 3,917,289 A | * | 11/1975 | Ivanov et al. | 277/400 |
| 4,961,678 A | * | 10/1990 | Janocko | 415/170.1 |
| 6,076,830 A | * | 6/2000 | Wu et al. | 277/387 |
| 7,377,518 B2 | * | 5/2008 | Lai | 277/400 |
| 2002/0079648 A1 | * | 6/2002 | Uth | 277/401 |

FOREIGN PATENT DOCUMENTS

| | | | |
|---|---|---|---|
| DE | 2 341 431 A | | 8/1973 |
| FR | 2 212 017 A | | 7/1974 |
| GB | 1 416 487 A | | 12/1975 |
| JP | 49-98666 | | 12/1974 |
| JP | 50-45155 A | | 4/1975 |
| JP | 02275182 A | * | 11/1990 |
| JP | 04000073 A | * | 1/1992 |
| JP | 08-303606 A | | 11/1996 |
| SE | 400 821 A | | 11/1973 |

* cited by examiner

*Primary Examiner*—Thomas B Will
*Assistant Examiner*—Gilbert Y Lee
(74) *Attorney, Agent, or Firm*—Arent Fox LLP

(57) ABSTRACT

A mechanical seal device includes a rotational seal ring connected to a rotational shaft, having a rotational seal surface and arc-shaped grooves arranged on the rotational seal surface. The grooves are sectionalized by partition walls. A stationary seal ring has a stationary seal surface facing the rotational seal surface of the rotational seal ring. A spring biases the stationary seal ring against the rotational seal ring. Outlet portions are formed on the stationary seal surface of the stationary seal ring and connect with a fluid supply path for supplying a pressure fluid. A circumferential direction length ($W_3$) of each outlet portion is made to be ½ of a circumferential direction length ($W_1$) of each partition wall or longer ($W_3 \geq W_1/2$); and a circumferential direction length ($W_3$) of the outlet portions is made to be shorter than a circumferential direction length ($W_2$) of the arc-shaped grooves ($W_3 < W_2$).

4 Claims, 22 Drawing Sheets

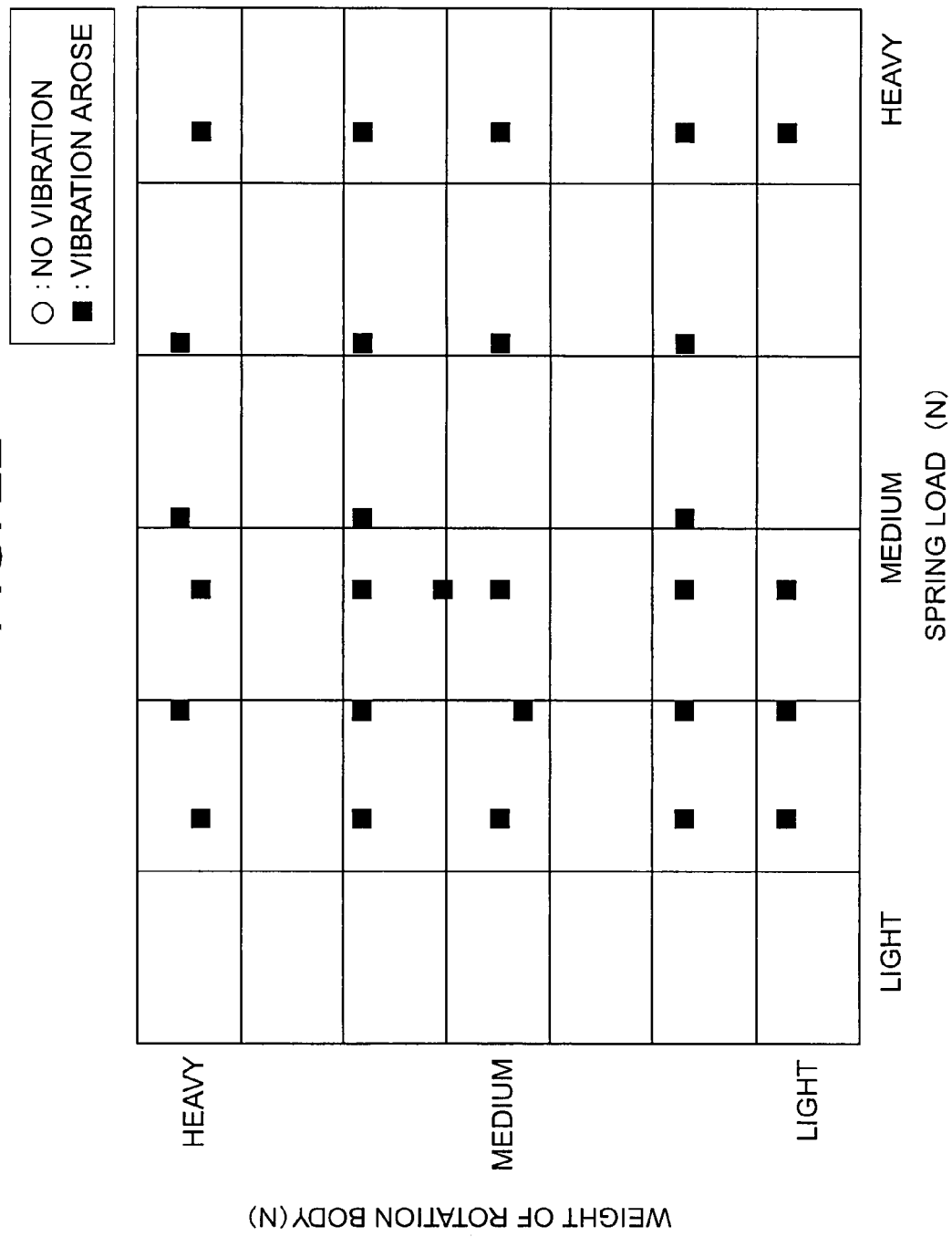

MECHANICAL SEAL DEVICE

CROSS-REFERENCE TO RELATED APPLICATION

This application is a National Stage entry of International Application No. PCT/JP2005/1019923, filed Oct. 28, 2005, the entire specification claims and drawings of which are incorporated herewith by reference.

TECHNICAL FIELD

The present invention relates to a mechanical seal device wherein incorporation of an abrasion powder to a sealed fluid is prevented by preventing wear between seal surfaces of a seal ring by suppressing vibration of the rotational seal ring and preventing contact between the seal surfaces.

BACKGROUND ART

A technique of the present invention is useful as a mechanical seal for sealing a fluid to be sealed in semiconductor production facilities, etc. In semiconductor production facilities, etc., when an impurity is included in a sealed fluid, it adversely affects the products. Therefore, it is necessary to prevent incorporation of an abrasion powder to the sealed fluid caused by wear of a seal ring at the time of rotation in the mechanical seal device. As a countermeasure, a non-contact mechanical seal device is used to prevent wear of seal surfaces of the seal ring.

As such a non-contact mechanical seal device, there is known a device comprising a rotational seal ring connected to a rotational shaft of a semiconductor production facility, etc. and having a rotational seal surface and a stationary seal ring having a stationary seal surface facing to the rotational seal surface of the rotational seal ring; wherein grooves (pockets) capable of connecting to a fluid supply path for supplying a pressure fluid is formed on the stationary seal surface (for example, refer to the patent articles 1 and 2).

Also, there is known a device wherein arc-shaped grooves are formed on the stationary seal surface and arc-shaped grooves are formed on the rotational seal surface of the rotational seal ring (for example, refer to the patent article 3).

In the above mechanical seal devices, a floating force of the stationary seal ring is made larger comparing with that of the rotational seal ring by forming grooves on the stationary seal surface, so that wear is prevented. Also, in such a mechanical seal device, a larger floating force can be obtained by increasing a volume of the grooves formed on the stationary seal surface.

However, as the volume of the grooves formed on the stationary seal surface increases, vibration arises in a behavior of the rotational seal ring. The vibration is a phenomenon called Pneumatic Hammer caused by compressibility of a pressure fluid supplied between the rotational seal surface and the stationary seal surface. On the other hand, when the volume of the grooves formed on the stationary seal surface is decreased to suppress the Pneumatic Hammer phenomenon, a sufficient floating force cannot be obtained and the rotational seal surface contacts with the stationary seal surface.

Also, in the above mechanical seal device described in the patent article 3, the grooves formed on the stationary seal surface and the grooves formed on the rotational seal surface have approximately the same size. Therefore, there is almost no volume difference and the effect of the grooves formed on the rotational seal surface cannot be obtained sufficiently, so that vibration also arises in a behavior of the rotational seal ring due to the Pneumatic Hammer phenomenon in this case.

Patent Article 1: Specification of the International Publication No. WO 00/075540

Patent Article 2: The Japanese Unexamined Patent Publication No. H03-277874

Patent Article 3: Specification of the U.S. Pat. No. 3,917,289

DISCLOSURE OF THE INVENTION

An object of the present invention is to provide a mechanical seal device capable of preventing incorporation of an abrasion powder to a sealed fluid by suppressing vibration of a rotational seal ring and preventing contact between seal surfaces.

The present invention was made to overcome the technical problems as above, and the technical means for solving is as below.

A mechanical seal device of the present invention according to claim 1 is a mechanical seal device, wherein a rotational seal ring and a stationary seal ring are arranged to face to each other between a rotational shaft and a housing fit together: wherein the rotational seal ring connected to the rotational shaft, having a rotational seal surface, and having a plurality of arc-shaped grooves arranged on the rotational seal surface to be a circular shape around an axis center of the rotational shaft, the grooves being sectionalized by partition walls;

the stationary seal ring having a stationary seal surface facing to the rotational seal surface of the rotational seal ring;

a bias means for pressing the stationary seal ring against the rotational seal ring; and outlet portions formed on the stationary seal surface of the stationary seal ring and capable of connecting with a fluid supply path for supplying a pressured fluid are provided;

a circumferential direction length ($W_3$) of each of the outlet portions is made to be ½ of a circumferential direction length ($W_1$) of each of the partition walls or longer ($W_3 \geq W_1/2$); and a circumferential direction length ($W_3$) of each of the outlet portions is made to be shorter than a circumferential direction length ($W_2$) of each of the arc-shaped grooves ($W_3 < W_2$).

In the present invention, arc-shaped grooves are formed along the circumferential direction on the rotational seal surface of the rotational seal ring. Also, a circumferential direction length ($W_3$) of each of the outlet portions is made to be shorter than a circumferential direction length ($W_2$) of each of the arc-shaped grooves ($W_3 < W_2$). As a result, the Pneumatic Hammer phenomenon caused by compressibility of a pressure fluid is suppressed and vibration of the rotational seal ring becomes hard to arise.

Also, in the present invention, two or more arc-shaped grooves are formed on the rotational seal surface and adjacent arc-shaped grooves are sectionalized by a partition wall. As a result, even when one seal surface tilts with respect to the other seal surface, a pressure becomes high in arc-shaped grooves positioned on the side with a narrowed space between the seal surfaces and the pressure acts as a recovery force for recovering the tilt, so that contact between the seal surfaces is prevented.

Furthermore, in the present invention, a circumferential direction length ($W_3$) of each of the outlet portions is made to be ½ of a circumferential direction length ($W_1$) of each of the partition walls or longer ($W_3 \geq W_1/2$). As a result, a sufficient floating force can be secured and a non-contact state between the seal surfaces can be preferably maintained.

In the mechanical seal device according to claim 2, the outlet portions are formed to be wider in the circumferential direction length than the fluid supply path;

the outlet portions are arranged to be an approximately concentric circle with the plurality of arc-shaped grooves on the stationary seal surface;

a circumferential direction length ($W_3$) of each of the outlet portions is made to be longer than a circumferential direction length ($W_1$) of each of the partition walls ($W_3 > W_1$); and the circumferential direction length ($W_3$) of the outlet portions is made to be shorter than ½ of a circumferential direction length ($W_2$) of the arc-shaped grooves ($W_3 < W_2/2$). As a result, vibration of the rotational seal ring and contact between the seal surfaces can be suppressed effectively.

In the mechanical seal device according to claim 3, the outlet portions are formed to be a circular-shaped or arc-shaped openings. As a specific shape of the outlet portions, for example, a circular shape and an arc shape may be mentioned.

In the mechanical seal device according to claim 4, the partition walls are formed to be relatively lower than the rotational seal surface and relatively higher than bottom surfaces of the arc-shaped grooves. As a result, vibration of the rotational seal ring and contact between the seal surfaces can be suppressed effectively.

As explained above, according to the present invention, contact between the rotational seal surface and the stationary seal surface can be suitably prevented while suppressing the Pneumatic Hammer phenomenon caused by a compressibility of a pressure fluid. Accordingly, it is possible to provide a mechanical seal device capable of preventing incorporation of an abrasion powder to a sealed fluid by suppressing vibration of the rotational seal ring and preventing contact between the seal surfaces.

BRIEF DESCRIPTION OF DRAWINGS

FIG. 22 is a graph showing a result of a vibration evaluation of the mechanical seal device in a comparative example.

EXPLANATION OF REFERENCES

Figure 1:
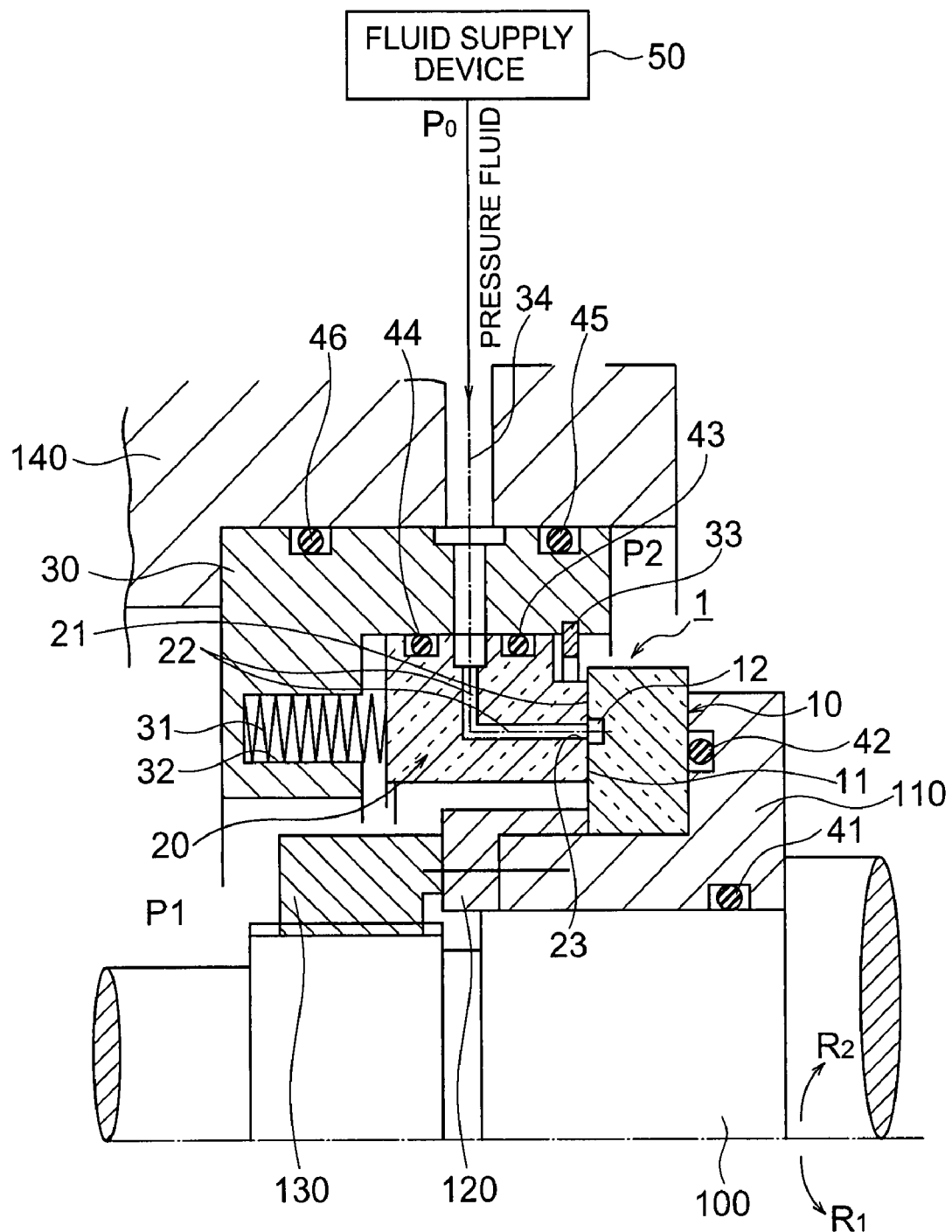
FIG. 1 is a sectional view of a mechanical seal device according to an embodiment of the present invention.

1 . . . mechanical seal device
10 . . . rotational seal ring
11 . . . rotational seal surface
12 . . . arc-shaped groove
13 . . . partition wall
14a . . . first dynamic pressure generation groove
14b . . . second dynamic pressure generation groove
15 . . . introduction path
16a . . . third dynamic pressure generation groove
16b . . . fourth dynamic pressure generation groove
20 . . . stationary seal ring
21 . . . stationary seal surface
22 . . . fluid supply path
23 . . . outlet portion
24a . . . first dynamic pressure generation groove
24b . . . second dynamic pressure generation groove
25 . . . introduction path
26a . . . third dynamic pressure generation groove
26b . . . fourth dynamic pressure generation groove 30 . . . holding member
31 . . . spring
32 . . . concave portion
33 . . . snap ring
34 . . . fluid supply path
41 to 46 . . . O-ring
50 . . . fluid supply device
100 . . . rotational shaft
110 . . . rotating member
120 . . . first press member
130 . . . second press member
140 . . . housing

BEST MODE FOR CARRYING OUT THE
INVENTION

Below, embodiments of the present invention will be explained based on the drawings.

Figure 2:
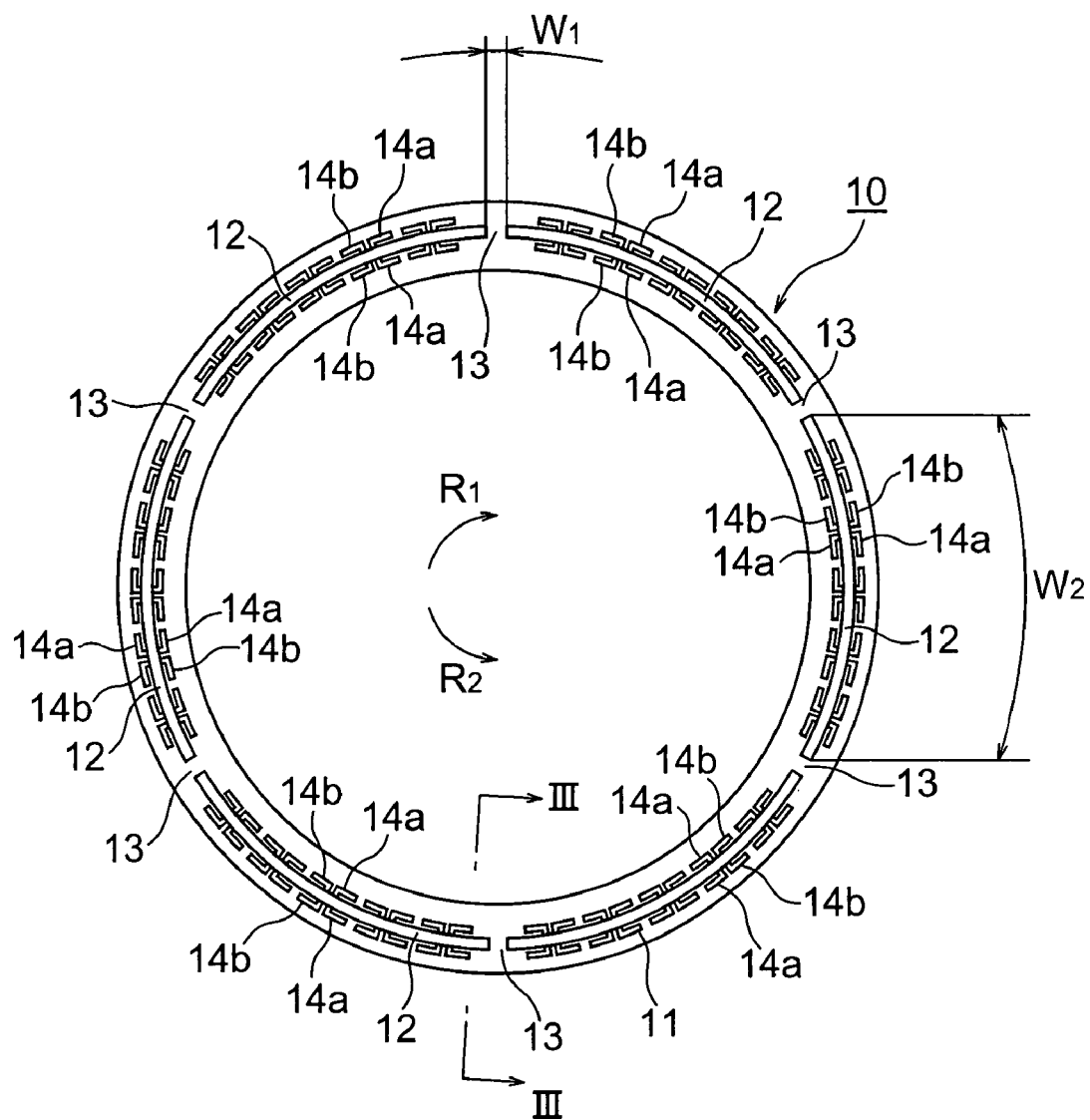
FIG. 2 is a front view showing a rotational seal ring of a mechanical seal device according to a first embodiment of the present invention.
Figure 3:
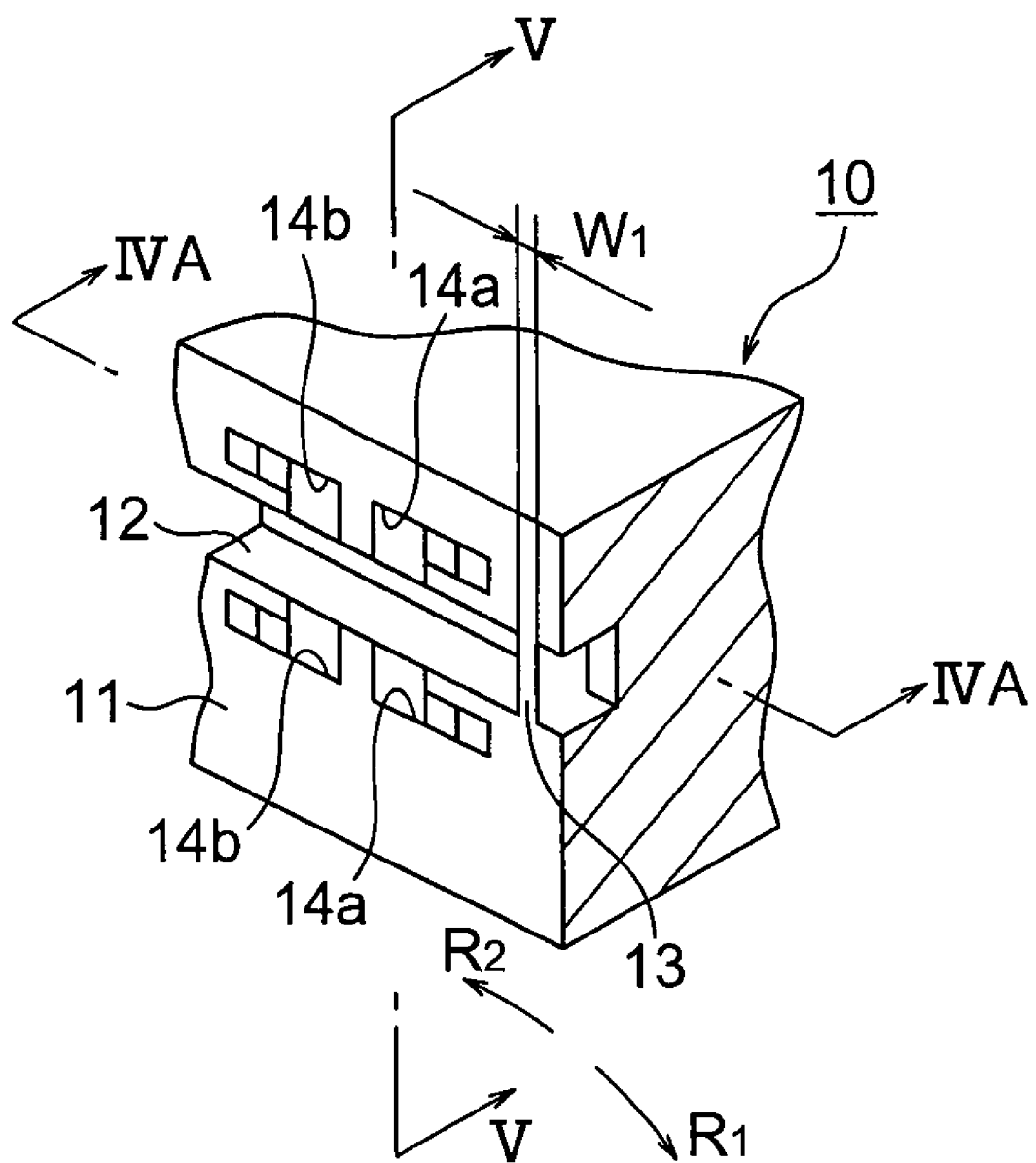
FIG. 3 is a sectional perspective view along the III-III line in FIG. 2.
Figure 4A:
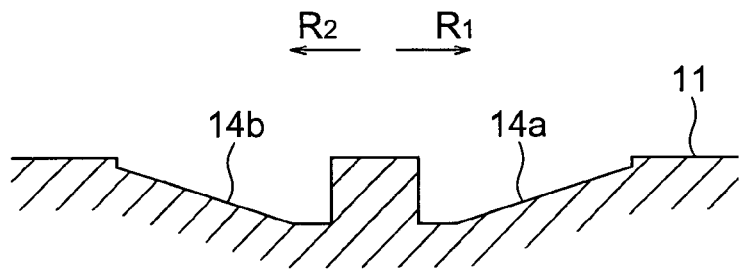
FIG. 4(A) is a sectional view along the IVA-IVA line in FIG. 3.
Figure 4B:
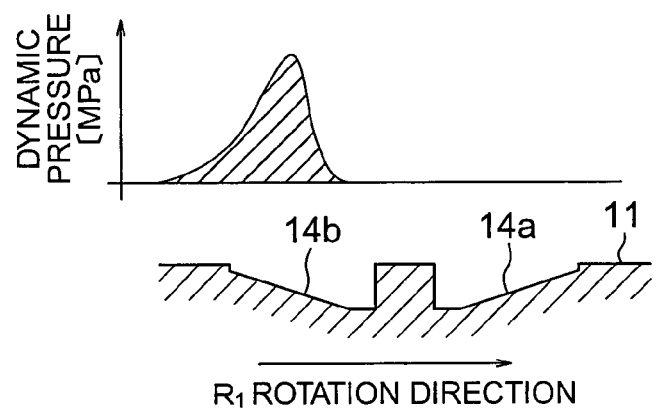
FIG. 4(B) is a graph showing a dynamic pressure generated when the rotational seal ring rotates in one direction.
Figure 4C:
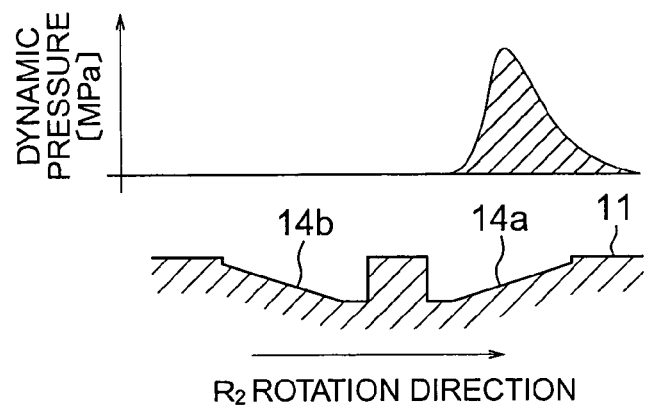
FIG. 4(C) is a graph showing a dynamic pressure generated when the rotational seal ring rotates in the other direction.
Figure 5:
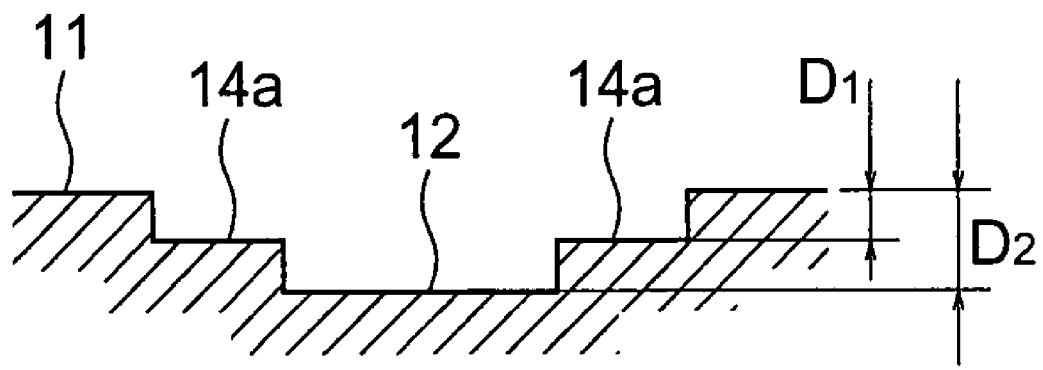
FIG. 5 is a sectional view along the V-V line in FIG. 3.
Figure 6:
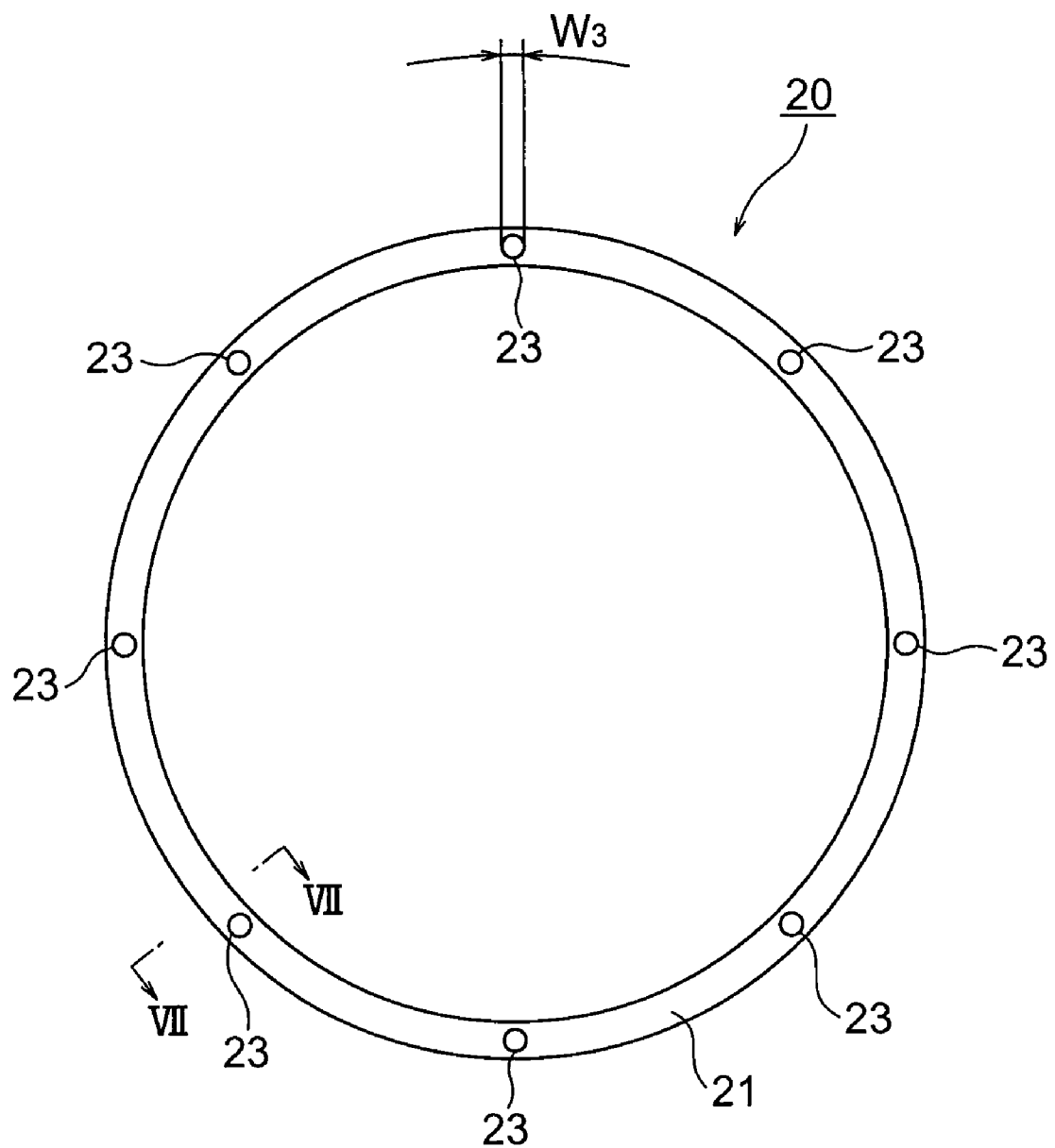
FIG. 6 is a front view showing a stationary seal ring of the mechanical seal device according to the first embodiment of the present invention.
Figure 7:
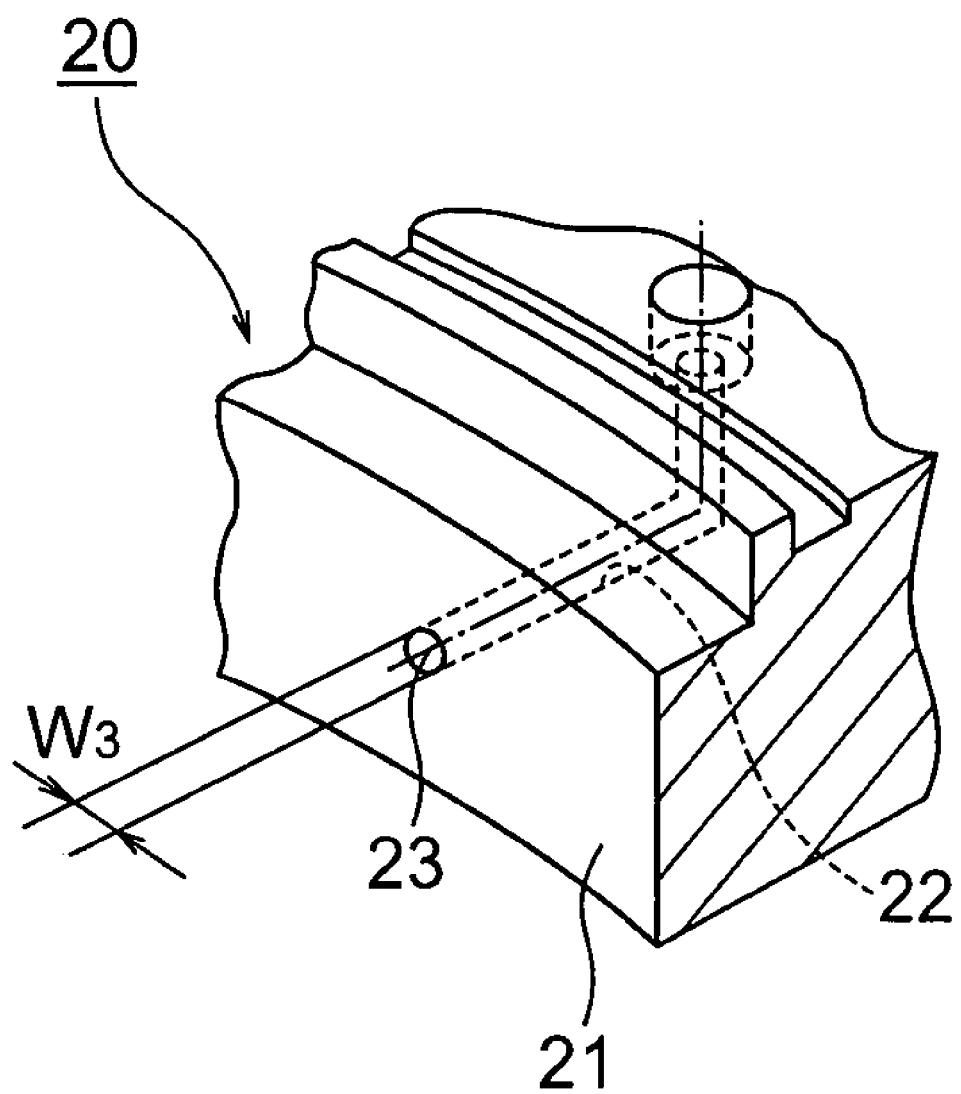
FIG. 7 is a sectional perspective view along the VII-VII line in FIG. 6.

FIG. 1 is a sectional view of a mechanical seal device according to an embodiment of the present invention. FIG. 2 is a front view showing a rotational seal ring of a mechanical seal device according to a first embodiment of the present invention. FIG. 3 is a sectional perspective view along the III-III line in FIG. 2. FIG. 4(A) is a sectional view along the IVA-IVA line in FIG. 3, FIG. 4(B) is a graph showing a dynamic pressure generated when the rotational seal ring rotates in one direction, and FIG. 4(C) is a graph showing a dynamic pressure generated when the rotational seal ring rotates in the other direction. FIG. 5 is a sectional view along the V-V line in FIG. 3. FIG. 6 is a front view showing a stationary seal ring of the mechanical seal device according to the first embodiment of the present invention. FIG. 7 is a sectional perspective view along the VII-VII line in FIG. 6.

A mechanical seal device 1 according to embodiments of the present invention is a non-contact mechanical seal device capable of sealing between a rotational shaft 100 and a housing 140 as shown in FIG. 1.

The mechanical seal device 1 comprises, as shown in FIG. 1, a rotational seal ring 10 attached to a rotating member 110 connected to the rotational shaft 100 and rotatable with the rotational shaft 100, a stationary seal ring 20 arranged to face to the rotational seal ring 10 along the axial direction, and a holding member 30 attached to the housing 140 for holding the stationary seal ring 20 via a spring 31 biasing the stationary seal ring 20 toward the rotational seal ring 10.

The rotational seal ring 10 of the mechanical seal device 1 according to the first embodiment is, as shown in FIG. 1 and FIG. 2, a ring member having a square-shaped section and attached to the rotating member 110. Therefore, the rotational seal ring 10 is rotatable in the forward rotation direction (the $R_1$ direction in the figure) and in the reverse direction (the $R_2$ direction in the figure) together with the rotational shaft 100. As a material for forming the rotational seal ring 10, for example, a silicon carbide material, special steel, carbon material, ceramic material and hard metal, etc. may be mentioned.

On a rotational seal surface 11 of the rotational seal ring 10, as shown in FIG. 2 and FIG. 3, six arc-shaped grooves 12 are formed substantially at even intervals along the circumferential direction. The six arc-shaped grooves 12 are arranged to form a circle around the axis of the rotational shaft on the rotational seal surface 11 and arranged at positions so as to be able to face to the later explained outlet portions 23 formed on the stationary seal surface 21 when the seal surfaces 11 and 21 face to each other.

Each of the arc-shaped grooves 12 is formed so that a circumferential direction length ($W_3$) of each of the outlet portions 23 becomes shorter ($W_3 < W_2$) than a circumferential direction length ($W_2$) of the arc-shaped groove 12. Also, a width along the diameter direction of each arc-shaped groove 12 is made to be equal to or larger than a radius of each outlet portion 23 formed on the stationary seal ring 20 and smaller than a width along the diameter direction of the seal surface 21 of the stationary seal ring 20. Furthermore, a depth of each arc-shaped groove 12 is about 3 mm or less at the deepest part and preferably about 2 mm or less, and more preferably 0.5 mm or less. Note that vibration of the rotational seal ring 10 becomes larger as the arc-shaped grooves 12 become deeper.

Between adjacent two arc-shaped grooves 12, a partition wall 13 for separating the arc-shaped grooves 12 is formed. As a result, even when the rotational seal surface 11 tilts with respect to the stationary seal surface 21, a pressure difference generated between the arc-shaped grooves 12 due to the tilt can be utilized as a recovery force for recovering the tilt, so that contact of the seal surfaces 11 and 21 can be prevented.

The partition walls 13 are formed so that the circumferential direction length ($W_3$) of each of the outlet portions 23 becomes ½ of the circumferential direction length ($W_1$) of each of the partition walls 13 or longer ($W_3 \geq W_1/2$). On the other hand, when the circumferential direction length $W_3$ of each of the outlet portions 23 is shorter than ½ of the circumferential direction length $W_1$ of the partition walls 13 ($W_3 < W_1/2$), a sufficient floating force cannot be secured.

Furthermore, on the rotational seal surface 11 of the rotational seal ring 10, as shown in FIG. 2, a plurality of first and second dynamic pressure generation grooves 14a and 14b are formed.

Each of the first dynamic pressure generation grooves 14a has an approximate L-shape as shown in FIG. 3 and has a slope bottom ascending toward the $R_1$ direction as shown in FIG. 4(A). Note that FIG. 4(A) is a sectional view along the IVA-IVA line in FIG. 3, wherein a pair of first and second dynamic pressure generation grooves 14a and 14b positioned at the outer circumferential side are cut along the axis of the rotational shaft and along the circumferential direction of the rotational seal surface 11. The first dynamic pressure generation grooves 14a are capable of generating a dynamic pressure by rotation of the rotational shaft 100 in the $R_1$ direction as shown in FIG. 4(B).

On the other hand, each of the second dynamic pressure generation grooves 14b has a linearly symmetric shape with each of the first dynamic pressure generation grooves 14a along the circumferential direction as shown in FIG. 3 and has a slope bottom surface ascending toward the $R_2$ direction as shown in FIG. 4(A). The second dynamic pressure generation grooves 14b are capable of generating a dynamic pressure by rotation of the rotational shaft 100 in the $R_2$ direction as shown in FIG. 4(C).

Accordingly, a dynamic pressure can be generated in either case that the rotational seal ring 10 rotates in the $R_1$ direction or $R_2$ direction with respect to the stationary seal ring 20. As a result, the same mechanical seal device 1 can be used for rotational shafts with different rotation directions, and compatibility of the mechanical seal device 1 can be improved. Note that FIG. 4(B) and FIG. 4(C) show distributions of generation of dynamic pressures with respect to sectional shapes of the dynamic pressure generation grooves, wherein the upper abscissa axis in the graph indicates a position on the section of the dynamic pressure generation grooves shown on the lower part.

The two kinds of dynamic pressure generation grooves 14a and 14b as above are, as shown in FIG. 2, arranged alternately along the circumferential direction on the outer circumferential side of the arc-shaped grooves 12. In the same way, on the inner circumferential side of the arc-shaped grooves 12, two kinds of dynamic pressure generation grooves 14a and 14b are arranged alternately along the circumferential direction. Accordingly, in the present embodiment, a plurality of the first and second dynamic pressure generation grooves 14a and 14b are arranged in the circumferential direction and also in the diameter direction on the rotational seal surface 11. Each of the dynamic pressure generation grooves 14a and 14b is connected to each of the arc-shaped grooves 12.

A depth $D_1$ of each of the respective dynamic pressure generation grooves 14a and 14b at its deepest part is, as shown in FIG. 5, not deeper than a depth $D_2$ of each of the arc-shaped grooves 12 ($D_1 \leq D_2$). Specifically, the depth $D_1$ at the deepest part of each of the dynamic pressure generation grooves 14 is preferably in a range of $5 \times 10^{-3}$ mm to $3 \times 10^{-2}$ mm.

By forming the dynamic pressure generation grooves 14a and 14b as above on the rotational seal surface 11, a dynamic pressure can be generated in addition to a static pressure.

The stationary seal ring 20 of the mechanical seal device 1 according to the first embodiment is, as shown in FIG. 1 and FIG. 6, a ring member having an approximately L-shaped section held by a holding member 30 so as not to rotate with the rotational shaft 100. As a material for forming the stationary seal ring 20, for example, a carbon material, special steel, silicon carbide material, ceramic material and hard metal, etc. may be mentioned.

Inside the stationary seal ring 20, as shown in FIG. 1 and FIG. 7, a fluid supply path 22 penetrating to the stationary seal surface 21 of the stationary seal ring 20 is formed. One end portion of the fluid supply path 22 opens at the outlet portions 23 on the stationary seal surface 21. Eight outlet portions are formed substantially at even intervals along the circumferential direction on the stationary seal surface 21. A circumferential direction length $W_3$ of each of the outlet portions 23 is 1 mm to 5 mm or so.

Note that, in the present embodiment, the outlet portions 23 were explained as circular shaped openings, however, the shape is not particularly limited in the present invention. They may be, for example, an oval shaped or long hole shaped openings. Alternately, they may be arc shaped openings as in the later explained eighth embodiment.

On the other hand, other end portion of the fluid supply path 22 is connected to a fluid supply device 50 for supplying a pressure fluid. By blasting a pressure fluid supplied from the fluid supply device 50 via the fluid supply path 22 from the outlet portions 23 to the rotational seal surface 11, the mechanical seal device 1 is capable of supplying the pressure fluid to between the rotational seal surface 11 and the stationary seal surface 21. As a pressure fluid supplied from the fluid supply device 50, for example, a nitrogen gas ($N_2$) or other inert gas may be mentioned.

The holding member 30 of the mechanical seal device 1 according to the first embodiment is, as shown in FIG. 1, a ring member having an approximately L-shaped section. The holding member 30 has a plurality of concave portions 32 formed substantially at even intervals along the circumferential direction at positions facing to the stationary seal ring 20. Each of the concave portions 32 houses a spring 31, and a tip of the spring 31 is attached to one end face of the stationary seal ring 20. The spring 31 presses the stationary seal ring 20 against the rotational seal ring 10 side.

The mechanical seal device 1 composed of the rotational seal ring 10, stationary seal ring 20 and holding member 30 as explained above is attached between the rotational shaft 100 and a housing 140 as explained below.

First, as shown in FIG. 1, a rotating member 110 is fixed to the rotational shaft 100 via an O-ring 41. An O-ring 42 is provided on a side circumferential surface of a step part of the rotating member 110, and the rotational seal ring 10 fits in the step part so as to be able to seal by the O-ring 42. The rotational seal ring 10 is fixed by a first press member 120. Furthermore, the rotating member 110 and the first press member 120 are fixed to the rotational shaft 100 via a second press member 130. The second press member 130 screws with the rotational shaft 100 to fasten and fix the rotating member 110 and the first press member 120.

Next, the stationary seal ring 20 is, as shown in FIG. 1, held at its one end surface by the holding member 30 via the spring 31 and held at its side surface by the holding member 30 via two O-rings 43 and 44 so as to be relatively movable along the axis direction with respect to the holding member 30. A snap ring 33 is attached to an inner circumferential surface of the holding member 30 for preventing the stationary seal ring 20 from dropping out from an inner circumferential hole of the holding member 30. Also, in the holding member 30, a fluid supply path 34 for connecting the fluid sully path 22 formed in the stationary seal ring 20 with the fluid supply device 50 is formed to penetrate inside the holding member 30. The holding member 30 is fixed to the housing 140 via two O-rings 45 and 46 so as not to rotate with the rotational shaft 100.

The mechanical seal device 1 according to the present embodiment is arranged between a high pressure environment with a sealed fluid of, for example, hydrogen sulfide and hydrogen fluoride, etc. and a low pressure environment (for example, vacuum, etc.) with a relatively low pressure than that of the high pressure environment. At this time, a pressure $P_0$ of the fluid supply device 50 for supplying a pressure fluid between the seal surfaces 11 and 21 is set to be higher than any one of a pressure $P_1$ in the high pressure environment and a pressure $P_2$ in the low pressure environment ($P_0 > P_1 > P_2$ or $P_0 > P_2 > P_1$).

In the mechanical seal device 1 configured as above, when a pressure fluid is supplied from the fluid supply device 50 through the fluid supply paths 34 and 22 formed in the holding member 30 and the stationary seal ring 20, the pressure fluid blasts from the outlet portions 23 against the rotational seal surface 11 and is supplied between the rotational seal surface 11 and the stationary seal surface 21. Then, as a result that the pressure fluid biases the stationary seal surface 21 in the direction of separating from the rotational seal surface 11 to balance with an elastic force of the spring 31, it is possible to seal between the seal surfaces 11 and 21 without contacting each other by a static pressure.

At this time, the pressure fluid blasted from the outlet portions 23 against the rotational seal surface 11 is introduced into the arc-shaped grooves 12 formed on the rotational seal surface 11 and spread between the seal surfaces 11 and 21, so that the Pneumatic Hammer phenomenon caused by compressibility of the pressure fluid is suppressed and vibration of the rotational seal ring 10 is suppressed.

Figure 8A:
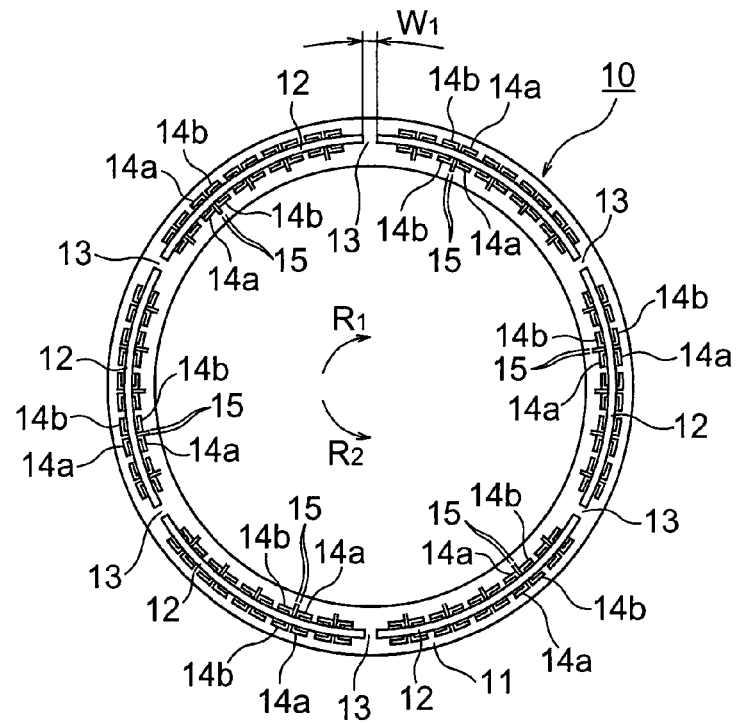
FIG. 8(A) is a front view showing a rotational seal ring of a mechanical seal device according to a second embodiment of the present invention.
Figure 8B:
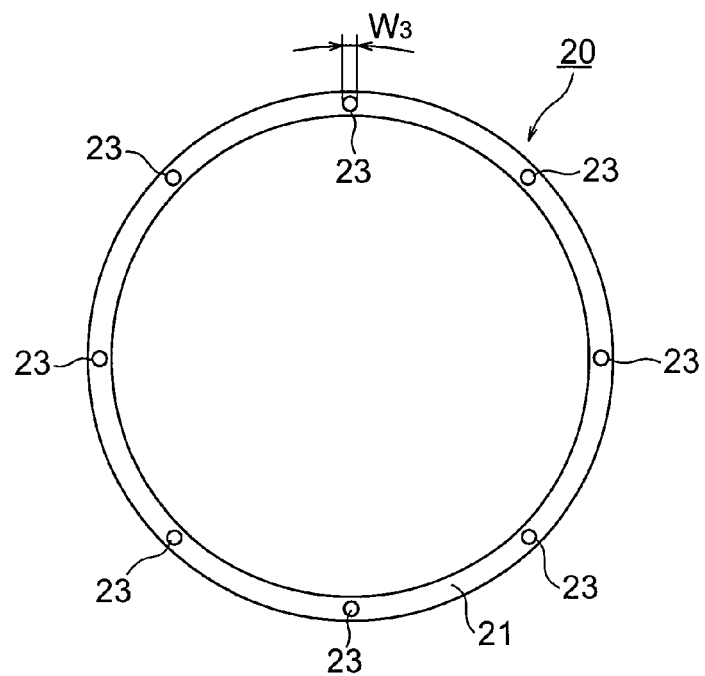
FIG. 8(B) is a front view showing a stationary seal ring of the mechanical seal device according to the second embodiment of the present invention.

FIG. 8(A) is a front view showing a rotational seal ring of a mechanical seal device according to a second embodiment of the present invention, and FIG. 8(B) is a front view showing a stationary seal ring of the mechanical seal device according to the second embodiment of the present invention.

The mechanical seal device according to the second embodiment of the present invention is, as shown in FIG. 8(A), different in a point that an introduction path 15 is provided in addition to the plurality of arc-shaped grooves 12 and dynamic pressure generation grooves 14a and 14b on the rotational seal surface 11 of the rotational seal ring 10, but is same with that in the first embodiment in other points.

The introduction path 15 in the present embodiment is a groove formed to be protruding to the furthermore inner circumferential side of the first and second dynamic pressure generation grooves 14a and 14b arranged along the circumferential direction on the inner circumferential side of the arc-shaped grooves 12 on the rotational seal surface 11. A depth of the introduction path 15 is, for example, $3 \times 10^{-3}$ mm to $15 \times 10^{-3}$ mm.

The introduction path 15 protrudes to the further inner circumferential side of a part sealed in a non-contact way by a pressure fluid on the rotational seal surface 11 and is capable of connecting to a high pressure environment positioned on the inner circumferential side of the stationary seal ring 20.

By forming such an introduction path 15, when supply of a pressure fluid from the fluid supply device 50 stops, a sealed fluid existing in the high pressure environment can be automatically introduced into the dynamic pressure generation grooves 14a via the introduction path 15, so that contact between the seal surfaces 11 and 21 can be prevented by the dynamic pressure generated by the dynamic pressure generation grooves 14a and 14b.

Figure 9A:
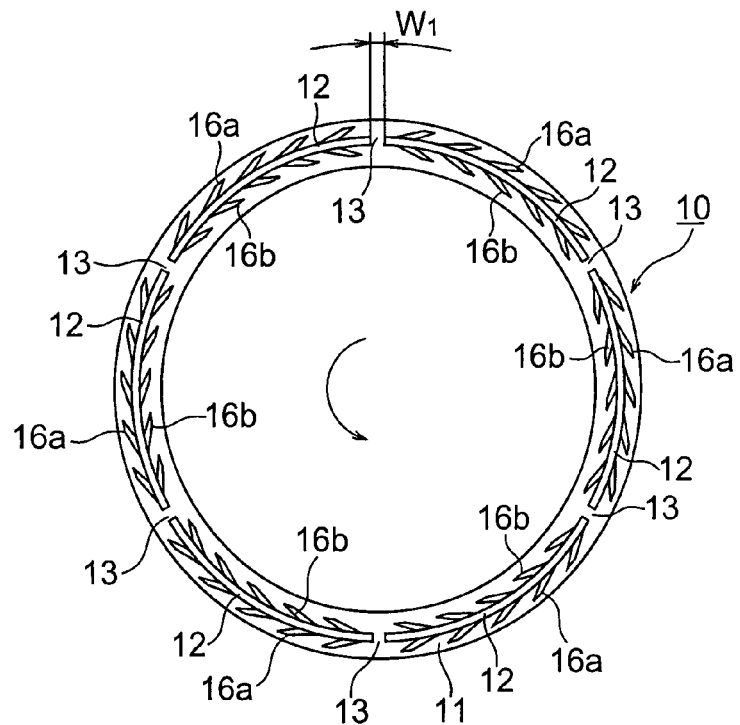
FIG. 9(A) is a front view showing a rotational seal ring of a mechanical seal device according to a third embodiment of the present invention.
Figure 9B:
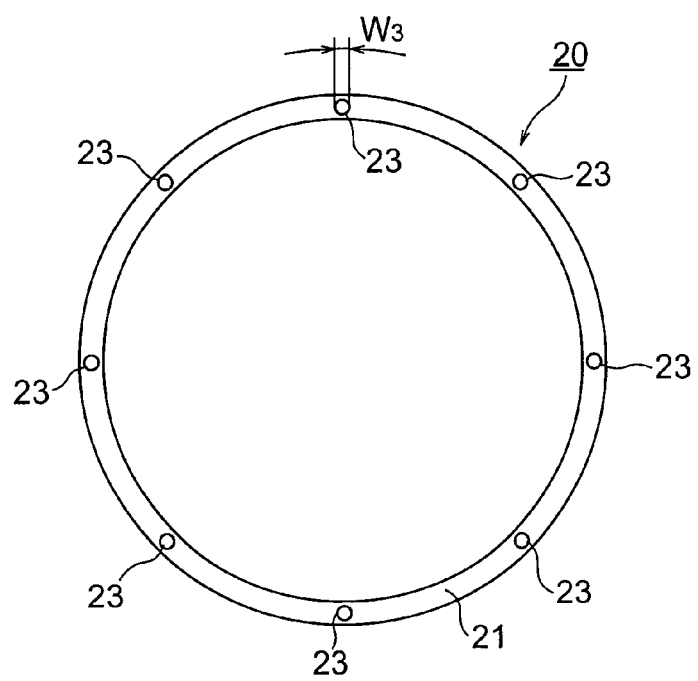
FIG. 9(B) is a front view showing a stationary seal ring of the mechanical seal device according to the third embodiment of the present invention.

FIG. 9(A) is a front view showing a rotational seal ring of a mechanical seal device according to a third embodiment of the present invention, and FIG. 9(B) is a front view showing a stationary seal ring of the mechanical seal device according to the third embodiment of the present invention.

In the mechanical seal device according to the third embodiment of the present invention, as shown in FIG. 9(A), third and fourth dynamic pressure generation grooves 16a and 16b are formed instead of the first and second dynamic pressure generation grooves 14a and 14b on the rotational seal surface 11 of the rotational seal ring 10.

The third dynamic pressure generation grooves 16a are slopes extending from the arc-shaped grooves 12 to the outer circumferential side, and the ends are within the rotational seal surface 11. On the other hand, the fourth dynamic pressure generation grooves 16b are slopes extending from the arc-shaped grooves 12 to the inner circumferential side, and the ends are within the rotational seal surface 11. They are formed to be linearly symmetric with the third dynamic pressure generation grooves 16a with respect to the arc-shaped grooves 12.

Figure 10A:
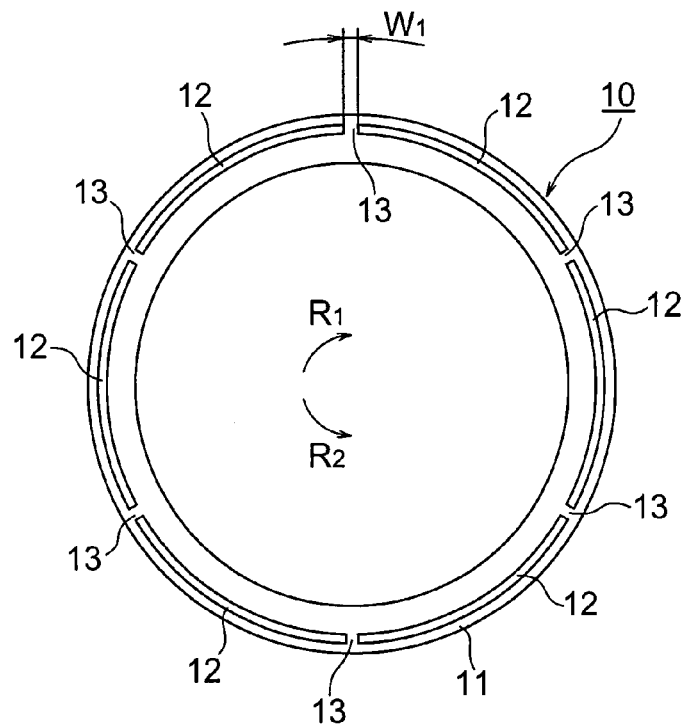
FIG. 10(A) is a front view showing a rotational seal ring of a mechanical seal device according to a fourth embodiment of the present invention.
Figure 10B:
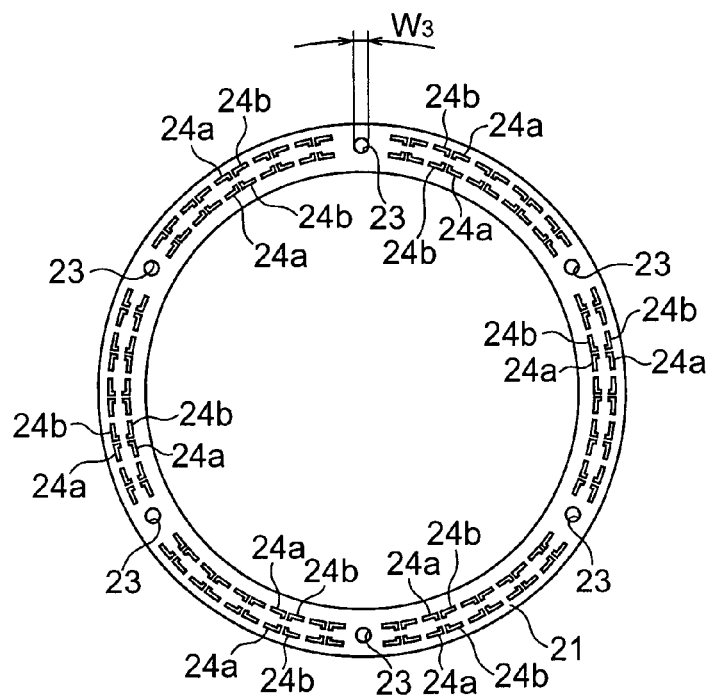
FIG. 10(B) is a front view showing a stationary seal ring of the mechanical seal device according to the fourth embodiment of the present invention.

FIG. 10(A) is a front view showing a rotational seal ring of a mechanical seal device according to a fourth embodiment of the present invention, and FIG. 10(B) is a front view showing a stationary seal ring of the mechanical seal device according to the fourth embodiment of the present invention.

The mechanical seal device according to the fourth embodiment of the present invention is different from that in the first embodiment in points that the first and second dynamic pressure generation grooves 14a and 14b are removed from the rotational seal surface 11 (refer to FIG. 2) of the rotational seal ring 10 in the first embodiment as shown in FIG. 10(A) and that first and second dynamic pressure generation grooves 24a and 24b are added to the stationary seal surface 21 (refer to FIG. 6) of the stationary seal ring 20 in the first embodiment as shown in FIG. 10(B), but other configuration is the same as that in the first embodiment. The first and second dynamic pressure generation grooves 24a and 24b formed on the stationary seal surface 21 are configured in the same way as the first and second dynamic pressure generation grooves 14a and 14b formed on the rotational seal surface 11 explained in detail in the first embodiment.

A dynamic pressure can be generated in addition to a static pressure even when forming the first and second dynamic pressure generation grooves 24a and 24b on the stationary seal surface 21 instead of the rotational seal surface 11 as explained above.

Figure 11A:
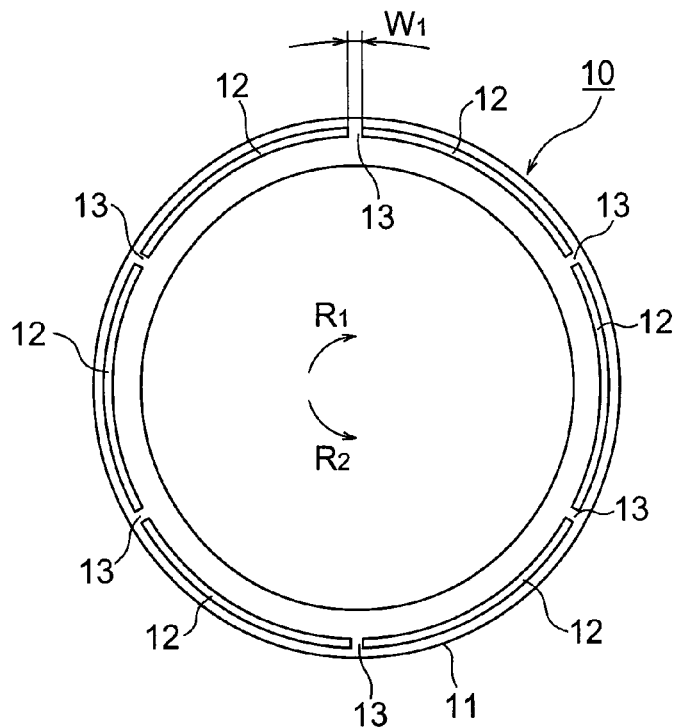
FIG. 11(A) is a front view showing a rotational seal ring of a mechanical seal device according to a fifth embodiment of the present invention.
Figure 11B:
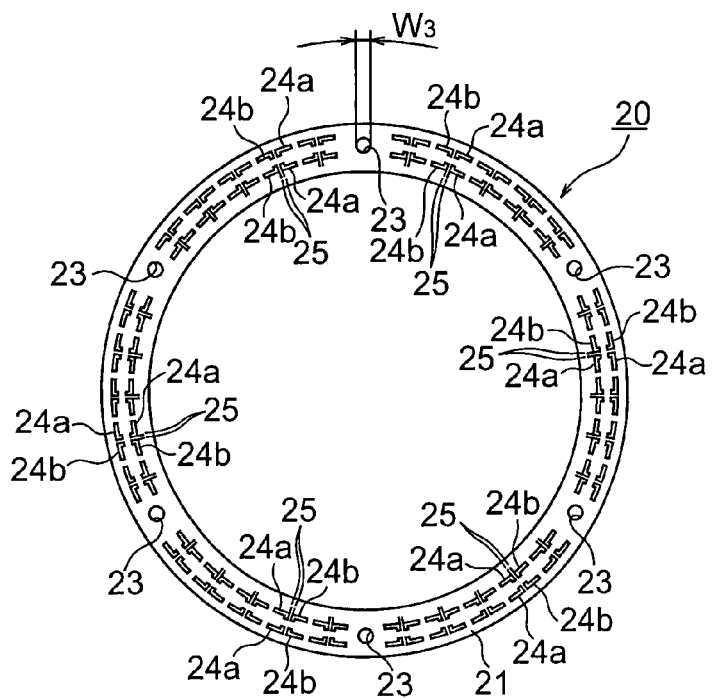
FIG. 11(B) is a front view showing a stationary seal ring of the mechanical seal device according to the fifth embodiment of the present invention.

FIG. 11(A) is a front view showing a rotational seal ring of a mechanical seal device according to a fifth embodiment of the present invention, and FIG. 11(B) is a front view showing a stationary seal ring of the mechanical seal device according to the fifth embodiment of the present invention.

The mechanical seal device according to the fifth embodiment is different from that in the second embodiment in points that, as shown in FIG. 11(A), the first and second dynamic pressure generation grooves 14a and 14b and the introduction path 15 are removed from the rotational seal surface 11 (refer to FIG. 8(A)) of the rotational seal ring 10 in the second embodiment and that, as shown in FIG. 11(B), the first and second dynamic pressure generation grooves 24a and 24b and an introduction path 25 are added to the stationary seal surface 21 (refer to FIG. 8(B)) of the stationary seal ring 20 in the second embodiment, however, other configuration is the same as that in the second embodiment. Note that the introduction path 25 formed on the stationary seal surface 21 is configured in the same way as the introduction path 15 formed on the rotational seal surface 11 explained in detail in the second embodiment.

Figure 12A:
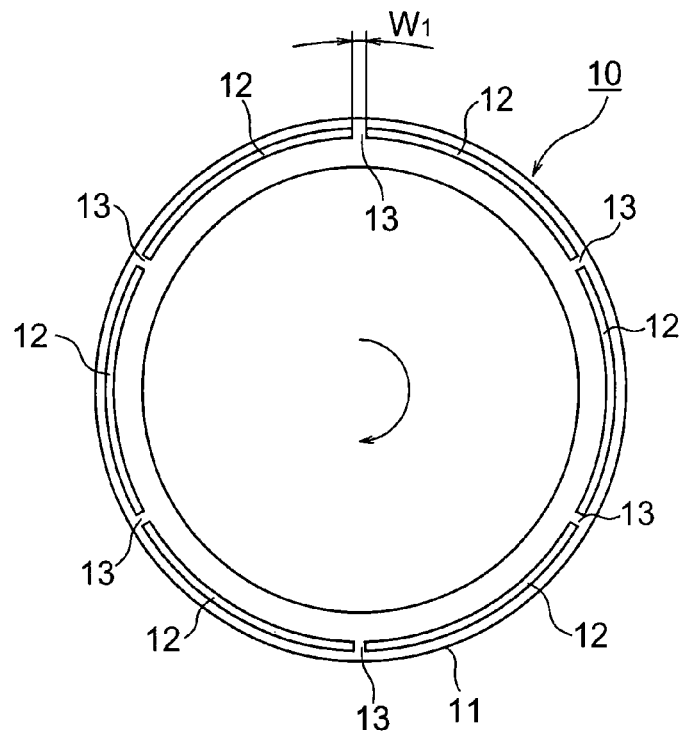
FIG. 12(A) is a front view showing a rotational seal ring of a mechanical seal device according to a sixth embodiment of the present invention.
Figure 12B:
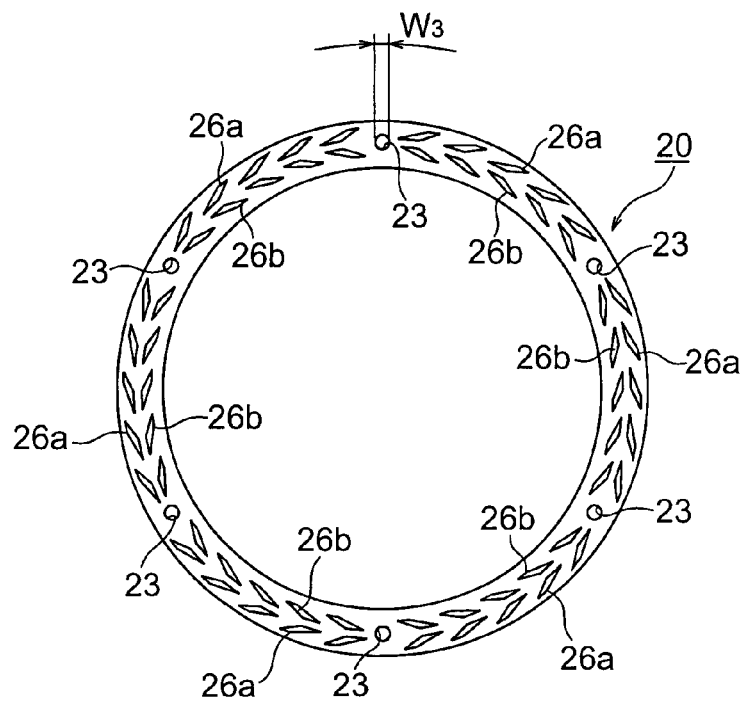
FIG. 12(B) is a front view showing a stationary seal ring of the mechanical seal device according to the sixth embodiment of the present invention.

FIG. 12(A) is a front view showing a rotational seal ring of a mechanical seal device according to a sixth embodiment of the present invention, and FIG. 12(B) is a front view showing a stationary seal ring of the mechanical seal device according to the sixth embodiment of the present invention.

The mechanical seal device according to the sixth embodiment is different from that in the third embodiment in points that, as shown in FIG. 12(A), the third and fourth dynamic pressure generation grooves 16a and 16b are removed from the rotational seal surface 11 (refer to FIG. 9(A)) of the rotational seal ring 10 in the third embodiment and that, as shown in FIG. 12-(B), the third and fourth dynamic pressure generation grooves 26a and 26b are added to the stationary seal surface 21 (refer to FIG. 9(B)) of the stationary seal ring 20 in the third embodiment, however, other configuration is the same as that in the third embodiment. Note that the third and fourth dynamic pressure generation grooves 26a and 26b formed on the stationary seal surface 21 are configured in the same way as the third and fourth dynamic pressure generation grooves 16a and 16b formed on the rotational seal surface 11 explained in detail in the third embodiment.

Figure 13A:
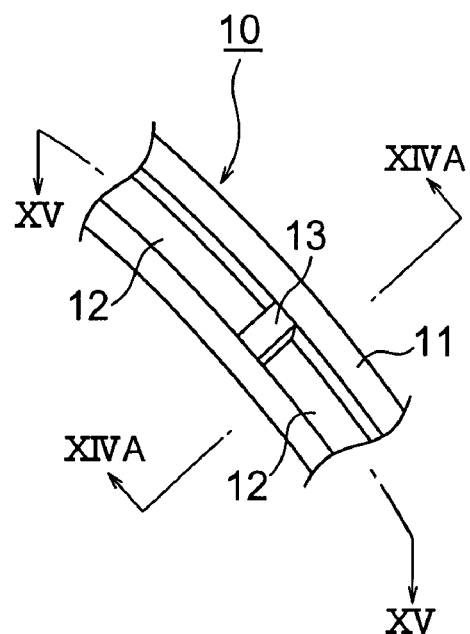
FIG. 13(A) is a partial perspective view showing a rotational seal ring of a mechanical seal device according to a seventh embodiment of the present invention.
Figure 13B:
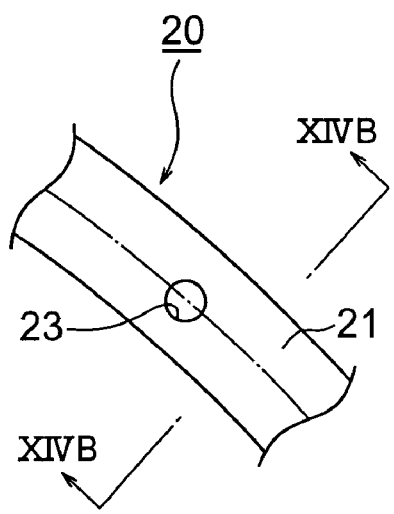
FIG. 13(B) is a front view showing a stationary seal ring of the mechanical seal device according to the seventh embodiment of the present invention.
Figure 14A:
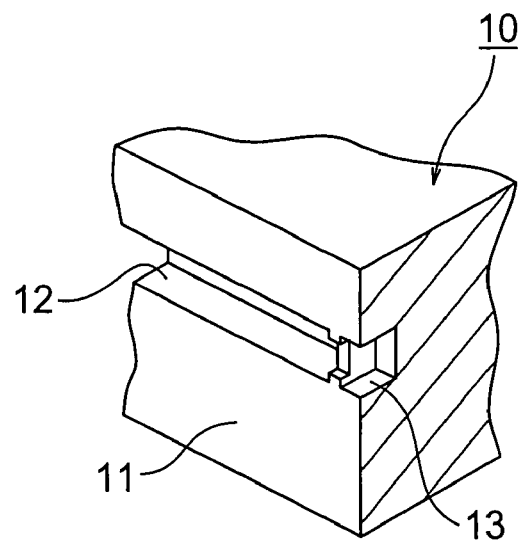
FIG. 14(A) is a sectional perspective view along the XIVA-XIVA line in FIG. 13(A)
Figure 14B:
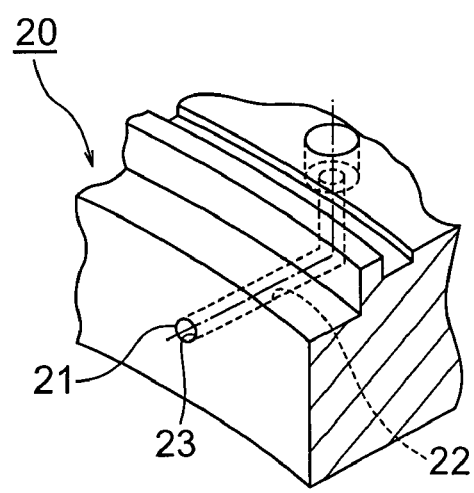
FIG. 14(B) is a sectional perspective view along the XIVB-XIVB line in FIG. 13(B).

FIG. 13(A) is a partial perspective view showing a rotational seal ring of a mechanical seal device according to a seventh embodiment of the present invention, and FIG. 13(B) is a front view showing a stationary seal ring of the mechanical seal device according to the seventh embodiment of the present invention. FIG. 14(A) is a sectional perspective view along the XIVA-XIVA line in FIG. 13(A), and FIG. 14(B) is a sectional perspective view along the XIVB-XIVB line in FIG. 13(B).

The mechanical seal device according to the seventh embodiment of the present invention is different from that in the first embodiment in a point that, as shown in FIG. 13(A) to FIG. 14(B), the partition walls 13 between adjacent arc-shaped grooves 12 are low, but other configuration is the same as that in the first embodiment.

Figure 15:
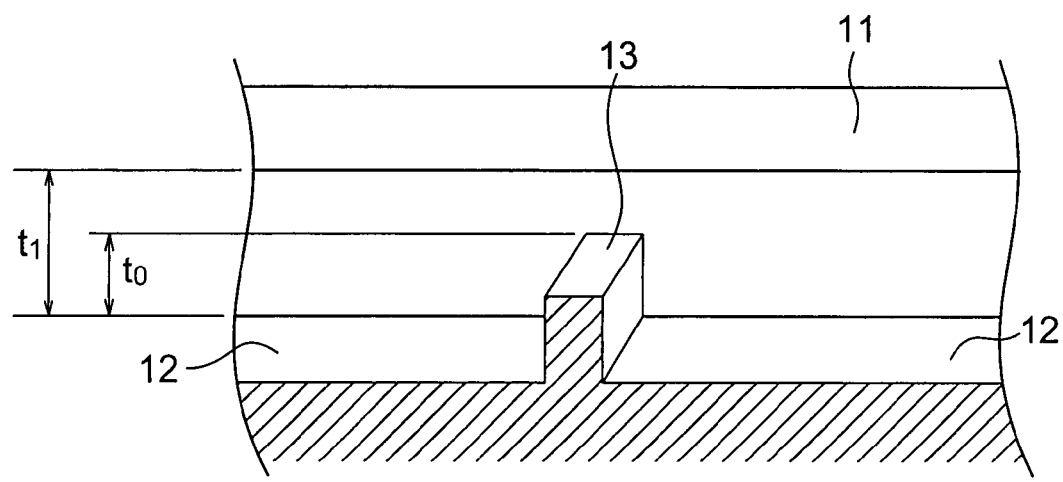
FIG. 15 is a sectional perspective view along the XV-XV line in FIG. 14(A).

In each of the partition walls 13 in the present embodiment, as shown in FIG. 15, a height to from an arc-shaped groove 12 to an upper surface of the partition wall 13 is lower than a height $t_1$ from the bottom of the arc-shaped groove 12 to the rotational seal surface 11 ($t_0 < t_1$). A difference ($t_1 - t_0$) of the height $t_0$ and the height $t_1$ is preferably 0.2 mm or smaller.

As explained above, by forming the partition walls 13 to be relatively higher than the bottom of the arc-shaped grooves 12, vibration of the rotational seal ring 10 and contact between the seal surfaces 11 and 12 can be suppressed effectively.

Figure 16A:
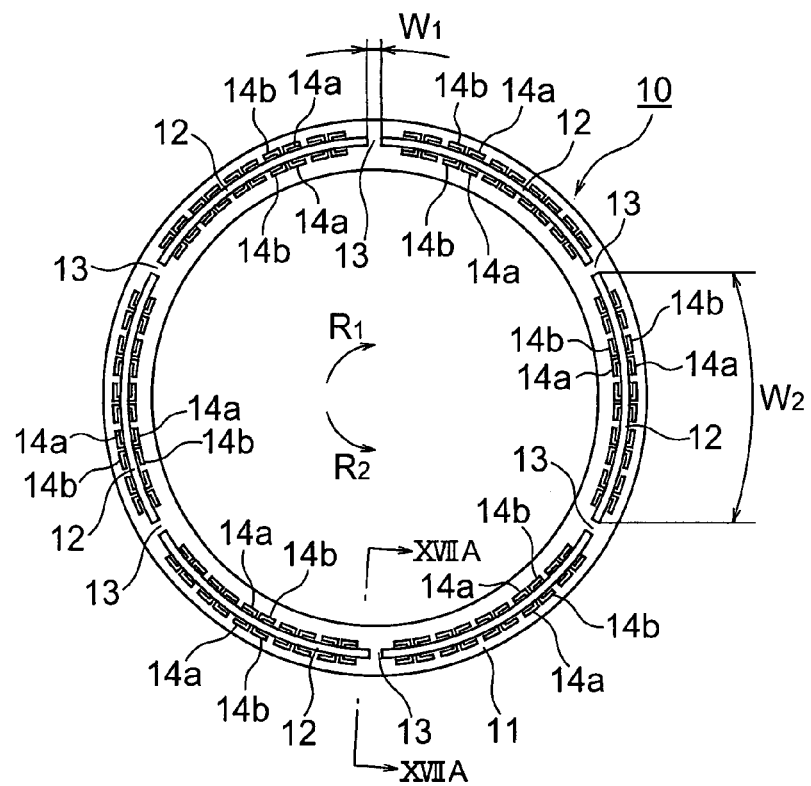
FIG. 16(A) is a front view showing a rotational seal ring of a mechanical seal device according to an eighth embodiment of the present invention.
Figure 16B:
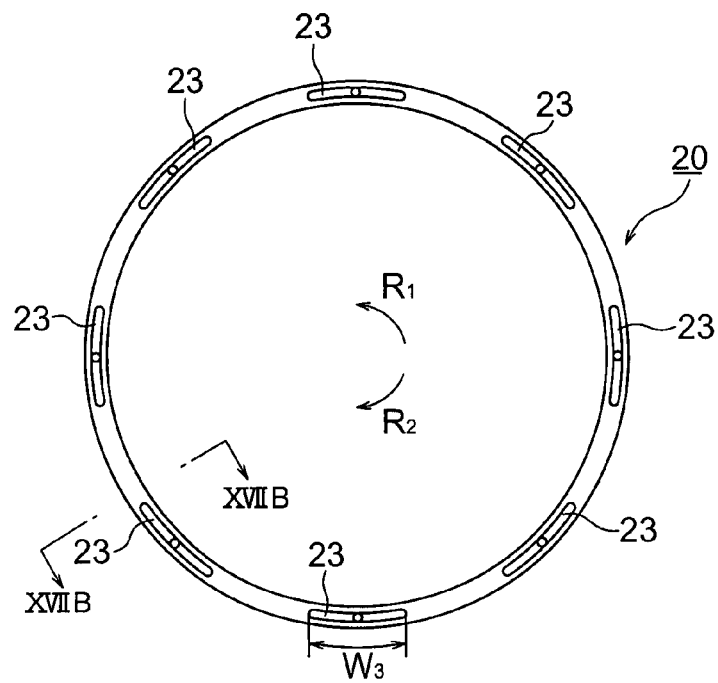
FIG. 16(B) is a front view showing a stationary seal ring of the mechanical seal device according to the eighth embodiment of the present invention.
Figure 17A:
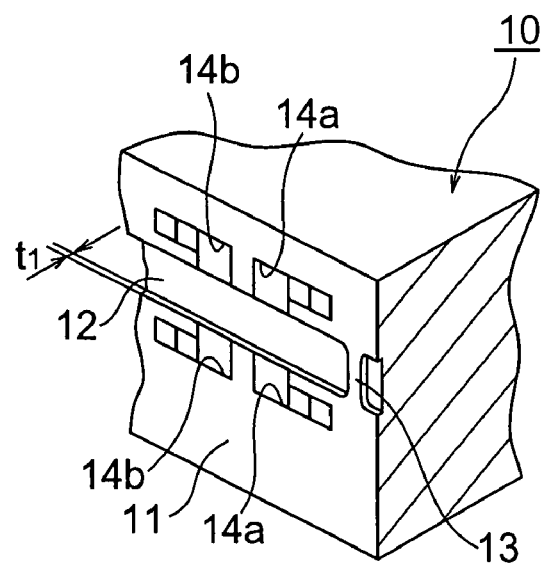
FIG. 17(A) is a sectional perspective view along the XVIIA-XVIIA line in FIG. 16(A)
Figure 17B:
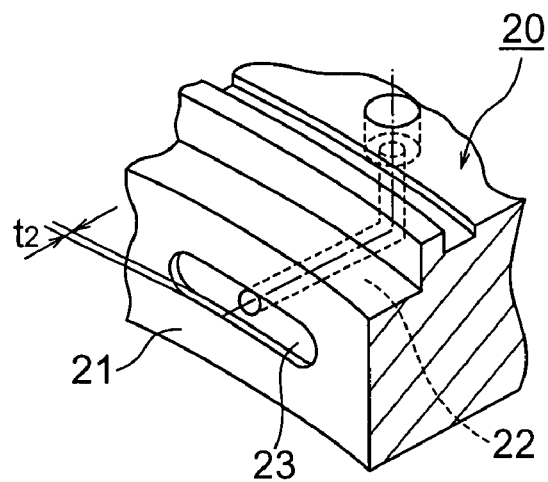
FIG. 17(B) is a sectional perspective view along the XVIIB-XVIIB line in FIG. 16(B).
Figure 18:
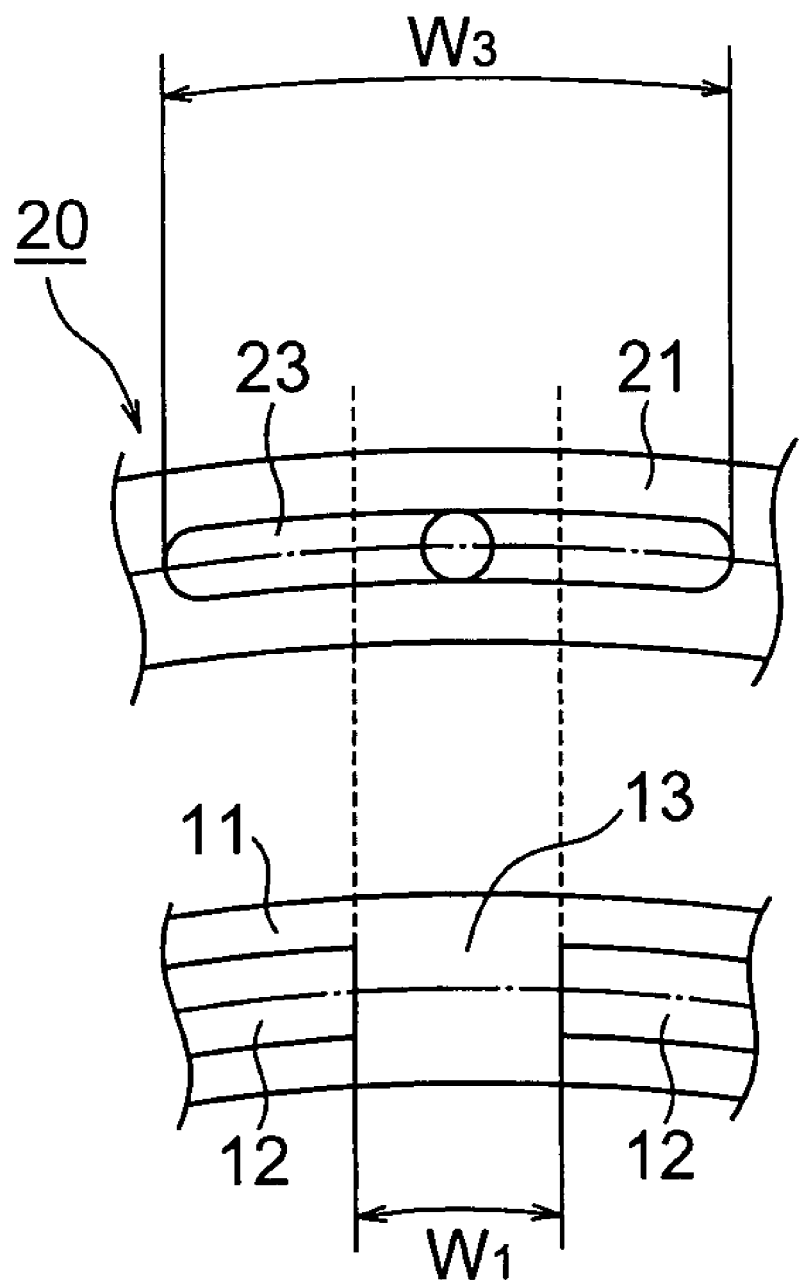
FIG. 18 is a view to explain a positional relationship of the rotational seal ring and the stationary seal ring of the mechanical seal device according to the eighth embodiment of the present invention.

FIG. 16(A) is a front view showing a rotational seal ring of a mechanical seal device according to an eighth embodiment of the present invention, and FIG. 16(B) is a front view showing a stationary seal ring of the mechanical seal device according to the eighth embodiment of the present invention. FIG. 17(A) is a sectional perspective view along the XVIIA-XVIIA line in FIG. 16(A), and FIG. 17(B) is a sectional perspective view along the XVIIB-XVIIB line in FIG. 16(B). FIG. 18 is a view for explaining a positional relationship of the rotational seal ring and the stationary seal ring of the mechanical seal device according to the eighth embodiment of the present invention.

The mechanical seal device according to the eighth embodiment of the present invention is different from that in the first embodiment in a point that, as shown in FIG. 16(A) to FIG. 17(B), outlet portions 23 of the stationary seal ring 10 are formed to be arc shapes in addition to the arc-shaped grooves 12 formed on the rotational seal surface 11, but other configuration is the same as that in the first embodiment.

On the stationary seal surface 21 of the stationary seal ring 20 in the present embodiment, as shown in FIG. 16(B), eight arc-shaped outlet portions 23 are formed along the circumferential direction substantially at even intervals. The eight outlet portions 23 are arranged so as to form a circle around the rotational shaft, arranged along the circumferential direction so as to have an identical radius being concentric with the arc-shaped grooves 12 and capable of facing to the arc-shaped grooves 12 formed on the rotational seal surface 11 when the seal surfaces 11 and 21 face to each other. By forming the outlet portions 23 in arc shapes in addition to forming the arc-shaped grooves 12, the Pneumatic Hammer phenomenon can be suppressed more efficiently.

On the bottom of each of the outlet portions 23, an outlet of a fluid supply path 22 is formed to connect with the outlet portions 23. The outlets are preferably formed at approximately center of the outlet portions 23, respectively.

In the present embodiment, circumferential direction lengths $W_3$ of the outlet portions 23 are set to be shorter than circumferential direction lengths $W_2$ of the arc-shaped grooves 12 ($W_3 < W_2$) and, preferably, the circumferential direction lengths $W_3$ of the outlet portions 23 are set to be shorter than ½ of the circumferential direction lengths $W_2$ of the arc-shaped grooves 12 ($W_3 < W_2/2$). As a result, a sufficient volume ratio can be secured between the arc-shaped grooves 12 and the arc-shaped outlet portions 23, and effects of the arc-shaped grooves 12 can be obtained.

Also, in the present embodiment, as shown in FIG. 16(A), FIG. 16(B) and FIG. 18, the circumferential direction length $W_3$ of the arc-shaped outlet portions 23 are set to be longer than circumferential direction lengths $W_1$ of the partition walls 13 separating between the arc-shaped grooves 12 ($W_3 > W_1$). Also, as shown in FIG. 17(A) and FIG. 17(B), depths $t_1$ of the arc-shaped grooves 12 are set to be not deeper than depths $t_2$ of the arc-shaped outlet portions 23 ($t_1 \leq t_2$). As a result, a sufficient floating force can be always secured, so that a non-contact state between the seal surfaces 11 and 21 can be preferably maintained. Note that the shorter the circumferential direction lengths $W_3$ of the arc-shaped outlet portions 23 are, the more preferable.

Note that the embodiments explained above are described to facilitate understanding of the present invention and is not to limit the present invention. Accordingly, respective elements disclosed in the above embodiments include all design modifications and equivalents belonging to the technical scope of the present invention.

For example, in the above embodiments, it was explained that dynamic pressure generation grooves were formed in addition to the arc-shaped grooves on the rotational seal surface, but the present invention is not particularly limited to that. Only the arc-shaped grooves may be formed on the rotational seal surface and the dynamic pressure generation grooves may be omitted.

EXAMPLES

Below, the effects of the present invention were confirmed by specific examples and comparative example of the present invention. The examples and comparative example below are for confirming the effects of the mechanical seal device used in the above embodiments.

Example 1

As a mechanical seal device of an example 1, a rotational seal ring having arc-shaped grooves formed thereon and a stationary seal ring having circular-shaped outlet portions formed thereon were used to produce a mechanical seal device configured as explained in the first embodiment. In the example 1, a depth $t_1$ of the arc-shaped grooves was 1 mm, a circumferential direction length $W_2$ of the arc-shaped grooves was 112 mm, a circumferential direction length $W_1$ of the partition walls was 4 mm and a circumferential direction length $W_3$ of the outlet portions was 2 mm. A production condition of the mechanical seal device produced in the example 1 is shown in Table 1.

[Table 1]

TABLE 1

| | Arc-shaped Groove | | | Partition Wall | | Outlet Portion | | |
| --- | --- | --- | --- | --- | --- | --- | --- | --- |
| | Formed or Not | Depth $t_1$ [mm] | CDL* $W_2$ [mm] | CDL* $W_1$ [mm] | Cut or Not | Amount $t_1-t_0$ [mm] | Formed or Not | Depth $t_2$ [mm] | CDL* $W_3$ [mm] |
| Example 1 | Yes | 1 | 112 | 4 | No | — | No | — | 2 |
| Example 2 | Yes | 1 | 112 | 4 | Yes | 0.07 | No | — | 2 |
| Example 3 | Yes | 0.05 | 112 | 4 | No | — | Yes | 0.5 | 15.4 |
| Comparative Example | No | — | — | — | No | — | Yes | 0.25 | 112 |

*CDL = Circumferential Direction Length

A vibration evaluation whether vibration arose in a behavior of the rotational seal ring or not was made on the mechanical seal device of the example 1. The vibration evaluation was made by using a nitrogen gas as a pressure fluid, measuring an acceleration along the rotational shaft direction generated at the rotational seal ring when supplying the nitrogen gas from the fluid supply device to between the seal surfaces with a flow amount of 20 Nl/min. while applying a pressure of 0.3 MPaG, and evaluating whether there was vibration based on the acceleration value. When the measured acceleration was lower than 0.05 G, it was evaluated as no vibration, while when the measured acceleration was 0.05 G or higher, it was evaluated there was vibration.

Figure 19:
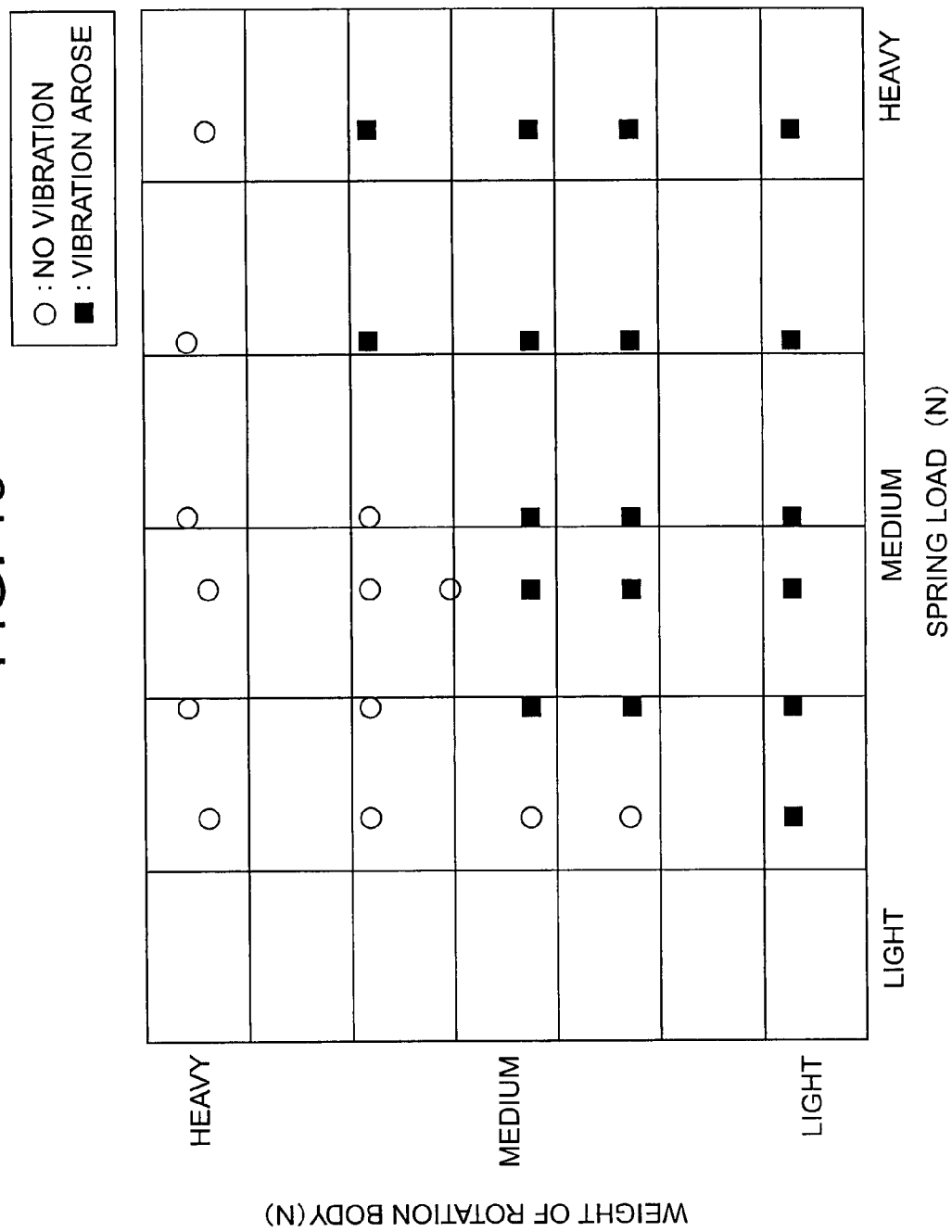
FIG. 19 is a graph showing a result of a vibration evaluation of the mechanical seal device in an example 1.

In this vibration evaluation, weight of a rotation body, such as a rotational shaft, rotating member and first and second press members, connected to the rotational seal ring and a spring load of a spring provided between the stationary seal ring and the holding member were used as parameters. Acceleration was measured under conditions of 31 patterns by changing the parameters, and vibration was evaluated under the respective conditions. FIG. 19 is a graph showing a result of the vibration evaluation of the mechanical seal device in the example 1.

Example 2

Figure 20:
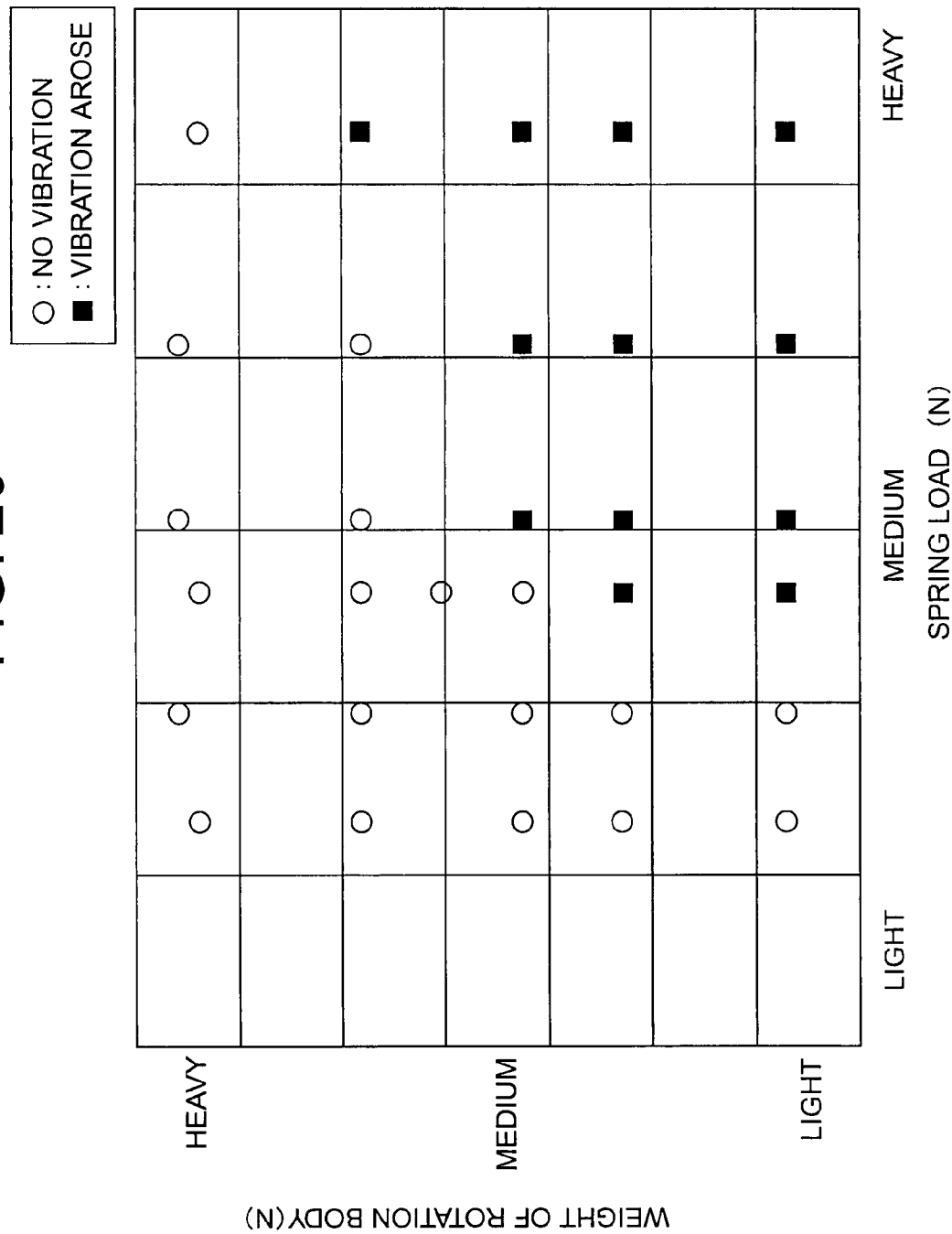
FIG. 20 is a graph showing a result of a vibration evaluation of the mechanical seal device in an example 2.

As a mechanical seal device of an example 2, a rotational seal ring having arc-shaped grooves formed thereon and low partition walls and a stationary seal ring having arc-shaped outlet portions formed thereon were used to produce a mechanical seal device configured as explained in the seventh embodiment. In the example 2, a depth $t_1$ of the arc-shaped grooves was 1 mm, a circumferential direction length $W_2$ of the arc-shaped grooves was 112 mm, a circumferential direction length $W_1$ of the partition walls was 4 mm, a cutting amount $(t_1-t_0)$ at upper parts of the partition walls was 0.07 mm and a circumferential direction length $W_3$ of the outlet portions was 2 mm. A production condition of the mechanical seal device produced in the example 2 is shown in Table 1. Vibration evaluation was made on the mechanical seal device of the example 2 under conditions of 31 patterns in the same way as in the example 1. FIG. 20 is a graph showing a result of the vibration evaluation of the mechanical seal device in the example 2.

Example 3

Figure 21:
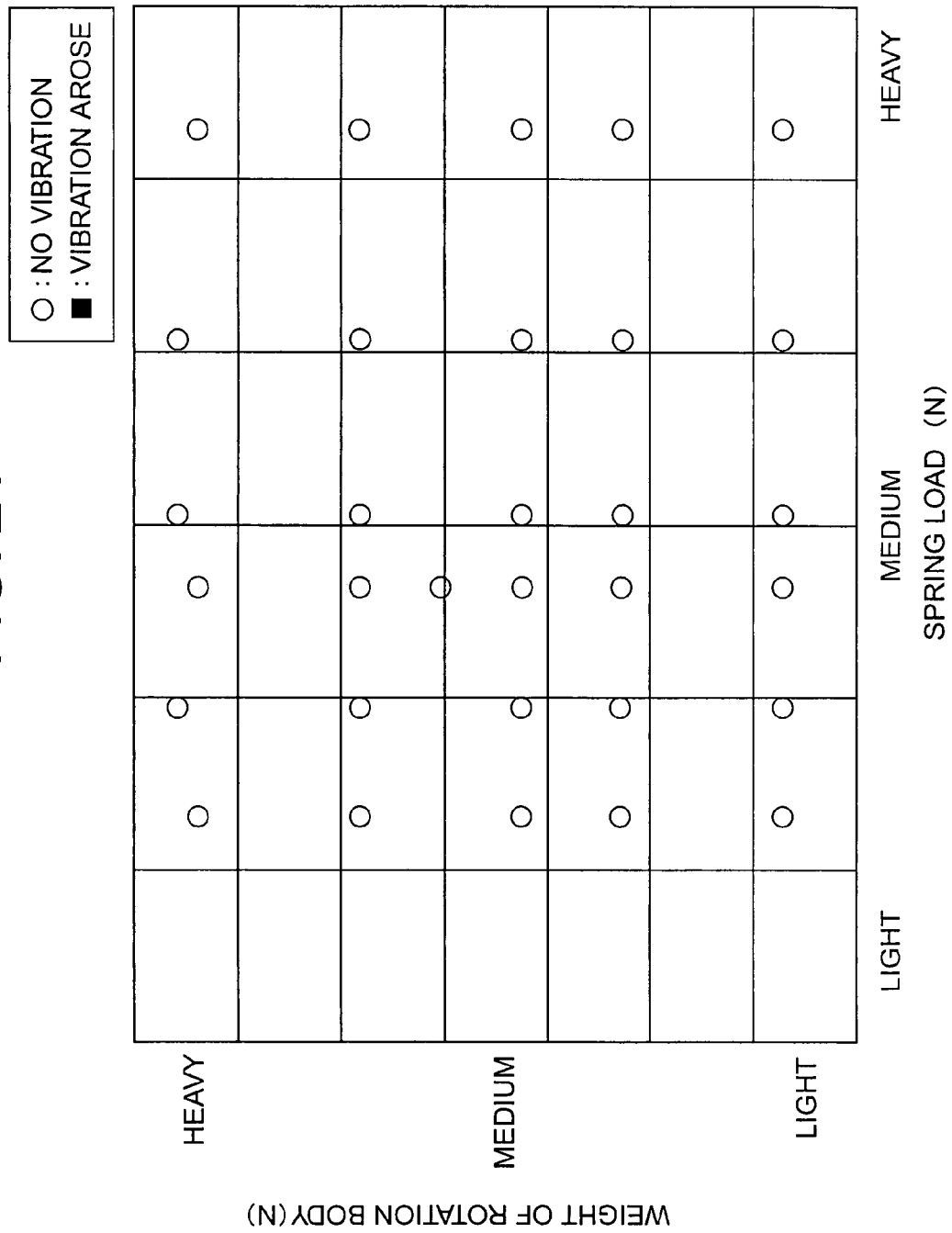
FIG. 21 is a graph showing a result of a vibration evaluation of the mechanical seal device in an example 3.

As a mechanical seal device of an example 3, a rotational seal ring having arc-shaped grooves formed thereon and a stationary seal ring having arc-shaped outlet portions formed thereon were used to produce a mechanical seal device configured as explained in the eighth embodiment. In the mechanical seal device of the example 3, a depth $t_1$ of the arc-shaped grooves was 0.05 mm, a circumferential direction length $W_2$ of the arc-shaped grooves was 112 mm, a circumferential direction length $W_1$ of the partition walls was 4 mm, a depth $t_2$ of the outlet portions was 0.5 mm and a circumferential direction length $W_3$ of the outlet portions was 15.4 mm. A production condition of the mechanical seal device produced in the example 3 is shown in Table 1. Vibration evaluation was made on the mechanical seal device of the example 3 under conditions of 28 patterns in the same way as in the example 1. FIG. 21 is a graph showing a result of the vibration evaluation of the mechanical seal device in the example 3.

Comparative Example

As a mechanical seal device of a comparative example, a rotational seal ring without an arc-shaped groove formed thereon and a stationary seal ring having arc-shaped outlet portions formed thereon were used to produce a mechanical seal device having a conventional configuration. In the mechanical seal device of the comparative example, a depth $t_2$ of the outlet portions was 0.25 mm, a circumferential direction length $W_3$ of the outlet portions was 112 mm. A production condition of the mechanical seal device produced in the comparative example is shown in Table 1. Vibration evaluation was made on the mechanical seal device of the comparative example under conditions of 28 patterns in the same way as in the example 1. FIG. 22 is a graph showing a result of the vibration evaluation of the mechanical seal device in the comparative example.

Review

When comparing the examples 1 to 3 with the comparative examples above, vibration of the rotational seal ring was confirmed to be reduced by forming arc-shaped grooves on the rotational seal surface.

Also, when comparing the example 1 with the example 2, vibration of the rotational seal ring was confirmed to be reduced by making the height of the partition walls lower than that of the rotational seal surface as shown in FIG. 19 and FIG. 20.

Furthermore, when comparing the example 1 and 2 with the example 3, vibration of the rotational seal ring was confirmed to be reduced by forming the outlet portions on the stationary seal surface to be arc shapes in addition to forming the arc-shaped grooves on the rotational seal surface as shown in FIG. 19 to FIG. 21.

INDUSTRIAL APPLICABILITY

As explained above, the mechanical seal device of the present invention is useful as a seal device for sealing a fluid to be sealed, which dislikes fine powders, used for semiconductor production facilities, etc. Also, it is useful as a seal device for improving a durability capability by preventing wear of a pair of seal rings.

The invention claimed is:

1. A mechanical seal device, wherein a rotational seal ring and a stationary seal ring are arranged to face to each other between a rotational shaft and a housing fit together, comprising:

the rotational seal ring connected to said rotational shaft, having a rotational seal surface, and having a plurality of arc-shaped grooves arranged on said rotational seal surface to be a circular shape around an axis center of said rotational shaft, the grooves being sectionalized by partition walls;

the stationary seal ring having a stationary seal surface facing the rotational seal surface of said rotational seal ring;

a bias means for pressing said stationary seal ring against said rotational seal ring; and outlet portions formed on said stationary seal surface of said stationary seal ring and capable of connecting with a fluid supply path for supplying a pressure fluid, wherein said arc-shaped grooves are arranged at positions facing said outlet portions formed on said stationary seal surface, wherein said outlet portions are arranged at positions forming a circle around the rotational shaft and having an identical radius that is concentric with said arc-shaped grooves, and wherein a circumferential direction length ($W_3$) of each of said outlet portions is made to be ½ of a circumferential direction length ($W_1$) of each of said partition walls or longer ($W_3 \geqq W_1/2$);

the circumferential direction length ($W_3$) of each of said outlet portions is made to be shorter than a circumferential direction length ($W_2$) of each of said arc-shaped grooves ($W_3 < W_2$).

2. The mechanical seal device as set forth in claim 1, wherein:

said outlet portions are formed to be wider in the circumferential direction length than said fluid supply path;

the outlet portions are arranged to be an approximately concentric circle with said plurality of arc-shaped grooves on said stationary seal surface;

a circumferential direction length ($W_3$) of each of said outlet portions is made to be longer than a circumferential direction length ($W_1$) of each of said partition walls ($W_3 > W_1$); and the circumferential direction length ($W_3$) of said outlet portions is made to be shorter than 1/2 of a circumferential direction length ($W_2$) of said arc-shaped grooves ($W_3 < W_2/2$).

3. The mechanical seal device as set forth in claim 1 or 2, wherein said outlet portions are formed to be a circular-shaped or arc-shaped openings.

4. The mechanical seal device as set forth in claim 1 or 2, wherein said partition walls are formed to be relatively lower than said rotational seal surface and relatively higher than bottom surfaces of said arc-shaped grooves.

* * * * *